United States Patent [19]

Damoulakis et al.

[11] Patent Number: 4,720,802
[45] Date of Patent: Jan. 19, 1988

[54] NOISE COMPENSATION ARRANGEMENT

[75] Inventors: John N. Damoulakis, Arlington Heights, Ill.; Michael E. Illikainen, Caledonia, Mich.; Michael D. Olinger, Grand Rapids, Mich.; Thomas E. Perfitt, Wyoming, Mich.

[73] Assignee: Lear Siegler, Santa Monica, Calif.

[21] Appl. No.: 517,462

[22] Filed: Jul. 26, 1983

[51] Int. Cl.[4] .................................................. G10L 5/00
[52] U.S. Cl. ..................................... 364/513.5; 381/43
[58] Field of Search ..................................... 381/41–46; 364/513.5

[56] References Cited

U.S. PATENT DOCUMENTS

| | | |
|---|---|---|
| 3,403,224 | 9/1968 | Schroeder ............................. 381/47 |
| 3,855,423 | 12/1974 | Brendzel et al. ....................... 381/47 |
| 4,092,493 | 5/1978 | Rabiner et al. ........................ 381/43 |
| 4,100,370 | 7/1978 | Suzuki et al. .......................... 381/42 |
| 4,481,593 | 11/1984 | Bahler .................................... 381/43 |
| 4,538,295 | 8/1985 | Noso et al. ............................. 381/47 |

Primary Examiner—E. S. Kemery
Attorney, Agent, or Firm—Varnum, Riddering, Schmidt & Howlett

[57] ABSTRACT

Adaptive speech recognition is improved by extracting an estimate of the background noise during unknown speech input, and using the noise estimate to modify the noiseless prestored reference speech signals for comparison with the input. Averaged values of autocorrelation coefficient and Toeplitz matrix elements representative of noise frames and prestored reference frames are used to calculate the LPC predictor signals.

27 Claims, 7 Drawing Figures

| NOISE FRAMES | UTTERANCE | NOISE FRAMES | UTTERANCE | NOISE FRAMES | UTTERANCE |

FIG. 3

NOISE COMPENSATION ARRANGEMENT

TECHNICAL FIELD

The invention relates to voice/speech recognition systems and, more particularly, to noise compensation arrangements in systems for correlating an unknown utterance to one of a plurality of predetermined reference utterances.

BACKGROUND ART

Historically, human interfaces with machines for purposes of effecting control of the machines and/or performing operations via systems controlled by an "output" of such machines have been restricted by the requirement of at least some minimum degree of manual activity. Even with the advent of electromechanical apparatus for performance of basic machine control functions and associated processes, such manual activity has been omnipresent, though it may be limited to initiation of machine operations in those instances where continued performance requires little or no "real time" human reasoning.

As computer devices and other digital and analog processing equipment have been developed during the past several decades, manual activity has continued to be a requirement. Similar to less complex devices, the particular human/machine communication interface with computer equipment is determined by operational requirements of the machine. For example, use of computer equipment for industrial control of a process may include the necessity of learning: (1) the particular programming language of the equipment, (2) the functions of various keys and keyboards, and (3) numerous other types of human/machine interfaces.

In several technological fields involving information processing, machine control and/or communication systems, it has been recognized that realizing the requisite human interface by means of voice and speech signals is substantially advantageous. Furthermore, with the recent development of microprocessor and other large-scale circuit integration technology, it has become possible to effect direct control of machines by vocal commands without requiring any substantial intermediate manipulation of switches or other mechanical or electromechanical operations.

The advantages of utilizing vocal commands to effect machine control is readily apparent. Regardless of the particular technological application in which such vocal commands are used, the most basic of these advantages is often the reduction of an operator's manual work load. Furthermore, the utilization of vocal commands also has the advantage of negating the necessity of the operator to learn programming languages, keyboard manipulations and other types of human/machine interfaces. That is, the use of vocal commands greatly simplifies the control operations since direct control is then effected by means of an operator's natural language.

During the past decade, a substantial amount of technological research has been done on the development of voice and speech recognition systems. Motivation for this development work has varied from the "pure" research often generated by the desire to understand human speech, to the "applied" research concepts for solving the various engineering problems associated with effecting machine control by means of vocal commands.

Of course, voice/speech recognition systems have many applications other than direct control of machines. For example, in the communication and business data processing fields, speech input arrangements can be utilized to record transactions, request telephone number information and various other functions. However, the basis for such applications, as well as the basis for directly controlling a machine, is the capability of permitting a human to interact with nonhuman equipment without diverting attention from other activity by requiring manual operations.

As readily apparent to any person having knowledge in the field of speech recognition systems, the engineering problems associated with such systems are substantial. Solutions to those engineering difficulties have been found in various prior art speech recognition systems whereby the basic concept of the system is to derive electrical signals (often referred to as "feature" signals) representative of input speech comprising unknown utterances, and comparing these signals to similar stored electrical signals corresponding to a "reference" set of particular speech segments or words to be recognized. If the resultant comparison of the input speech feature signals and one of the sets of reference word feature signals meets predetermined recognition criteria, the input speech is accepted as a particular speech segment to be recognized. Otherwise, the unknown utterance is rejected. It is readily apparent that the reliability of such speech recognition systems is highly dependent on the prescribed means of generating the electrical signals representative of the unknown utterances, the means for comparing feature signals and the particular recognition criteria utilized for determining an acceptable comparison.

Several types of prior art speech recognition systems derive feature signals on the basis of a spectral frequency analysis of electrical signals corresponding to the unknown utterance. For example, the Browning et al U.S. Pat. No. 4,087,680 issued May 2, 1978, describes a speaker-independent recognition system wherein time slices of analog input speech signals are analyzed for frequency content and digital samples thereof (sonograms) are generated which represent the energy contained within selected frequency bands. The samples are then processed utilizing an N-tuple pattern generation technique and the resulting pattern is compared with patterns of prestored vocabulary words.

Other types of speech recognition systems utilize a time domain analysis wherein, for example, the systems include generation of linear prediction parameter signals representative of the unknown utterances and the reference words. One such type of speech recognition system is disclosed in the Pirz et al. U.S. Pat. No. 4,181,821 issued Jan. 1, 1980. The Pirz et al recognition system comprises means for recognizing an unknown utterance as one of a set of reference words and implementation of a "training" mode whereby an analysis of a plurality of utterances of each one of a set of known reference words during the training mode provides a set of reference feature signals which include linear predictive coefficients stored in a memory of the speech recognition system. Pirz et al employ a "speaker-independent" system utilizing a clustering process to overcome the problem of determining a feature signal template which will provide a high degree of recognition accuracy over a broad range of speakers.

During the training mode of the Pirz et al recognition system process, a plurality of signal templates for each reference word are generated wherein the templates correspond to various acoustic features of the word. Each template is a sequence of feature signals representative of a "cluster" of similar feature signal sets obtained from repetitive utterances of the word. The feature signal sets are stored and partitioned into groups of "similar" sets. A distance measurement between each pair of signal sets for a specific reference word is provided by clustering circuitry.

The distance signals are applied to a matrix store, and a "centermost" feature signal set is then selected as a function of a distance signal matrix element. A first "tentative" cluster of the feature signal set is chosen by comparing the distance between a set and a predetermined threshhold distance. A centermost feature signal set is then chosen from the distance signals corresponding to the feature sets of the first tentative cluster. A second tentative cluster is then formed from the group of signal sets within another threshhold distance of the centermost signal set of the first cluster.

These reiterative grouping steps are repeated until the members of the feature signal set of the current tentative cluster are equivalent to members of the previous cluster. When this occurs, the current cluster is then identified as a "permanent" cluster and the centermost feature set of the permanent cluster is identified as a template signal representative of the cluster. After the first template signal is identified, the aforedescribed clustering process is repeated for the ungrouped feature sets. Accordingly, each cluster includes all feature signal sets which have a prescribed degree of similarity determined by prediction parameter distance signals without requiring a fixed number of sets in a cluster or the averaging of distance signals.

In the recognition mode of the Pirz et al system, linear prediction parameters of an unknown utterance are applied to various circuitry. On termination of the utterance, a distance processor generates distance signals representative of similarity between each reference template signal and the feature signal sets of the unknown utterance. A predetermined number of lowest-valued distance signals are then stored and an average of these signals is determined. A reference word code which corresponds to the minimum average distance signal is then selected as corresponding to the unknown utterance.

Another type of recognition system is disclosed in the Sambur U.S. Pat. No. 4,032,711 issued June 28, 1977. The Sambur system is a "speaker" verification and recognition system. In this system, digital speech signal frames are applied to a linear prediction coefficient (LPC) processor. The processor executes a prediction analysis of the sample speech signals utilizing conventional autocorrelation and partial correlation (PARCOR) coefficient signals.

To store feature signals of the speaker, the linear prediction parameter signals are applied to a covariance computer which produces a mean covariance matrix for the speaker utterances. The covariance matrix is a square matrix with dimensions equivalent to a pole value selected for the verification system. The covariance matrix for the entire speech sample is applied to an orthogonal parameter computer which generates a set of signals corresponding to a set of orthogonal parameters of the speech sample. These parameters provide a set of speaker-dependent but linquistically independent characteristics.

During verificiation of a current speaker, the PARCOR coefficients of the voice signals are applied to a "test orthogonal parameter generator" along with a set of reference vector signals from memory locations corresponding to the speaker against which the current speaker is to be verified. This generator produces a set of test orthogonal prediction parameters which are applied to processors for generating mean and variance signals of the orthogonal parameters across the voice sample. These signals are then compared with the mean and variance signals of the reference orthogonal parameters.

The comparison means utilized in the Sambur system comprises computation of a deviation signal which is a measure of similarity between the orthogonal parameters of the test speech and the reference speech. The comparison is "weighted" so that the orthogonal parameters which are relatively constant (i.e. small variance) over the speech samples are given greater weight. Such parameters tend to be linquistically independent and highly speaker-dependent.

As apparent from the foregoing, a substantial amount of effort has been devoted to achieving greater accuracy in identification of "speakers" and in identification of unknown utterances as one of a set of reference words where the speaker may be any individual, i.e. a "speaker-independent" arrangement. However, many of these prior art recognition systems are utilized in applications where a recognition accuracy in the range of 80-90% may be acceptable. Unfortunately, such an accuracy range is not acceptable in many "critical" applications. For example, if a speech recognition system is to be utilized in an aircraft whereby a pilot operator effects control of certain flight control functions by means of voice commands, it is apparent that a higher degree of accuracy is required.

In part, the accuracy of a speech recognition system can be increased by utilizing "speaker dependency" whereby prestored feature signals representative of reference words are derived during a training mode from identified words previously spoken by the same individual subsequently speaking the unknown utterance. However, the "training" of a speech recognition system is often time consuming and can require a substantial number of system components additional to those necessary for identification of an unknown utterance after the feature signals of the reference words have been stored. Furtherore, many of the speech recognition systems heretofore known in the prior art are structurally unsuitable for use in high perfomance aircraft to effect control of flight functions by means of pilot voice commands and have been incapable of achieving the requisite high accuracy of command word recognition.

One type of speech recognition system which utilizes time-domain analysis and represents a significant advance in the art of "critical function" recognition systems is described in the commonly assigned Eckley, Sr. U.S. patent application Ser. No. 302,175, filed Sept. 14, 1981, now abandoned. The Eckley system is a speaker dependent command recognition system which employs PARCOR coefficients and dynamic programming principles to achieve a substantially high recognition accuracy though operating in a severe acoustical environment. The Eckley recognition system will not be described in detail herein since the subsequent section entitled "Disclosure of the Invention" describes an illustrative embodiment of this invention employed in a recognition system substantially corresponding to that described in the Eckley application.

One type of engineering problem common to any communication/control system, and especially to speech recognition systems, relates to noise. That is, the documented history of research in electrical systems is replete with materials directed to goals of minimizing or otherwise compensating for noise in generation and transmission of desired electrical signals.

In no specific technological field are the concepts of noise theory of greater import than in the development of speech recognition systems. Indeed, the primary functions of any speech recognition system, i.e. converting speech into electrical signals and deriving a decision as to whether the signals "meet" a particular criteria such as "correspondence" to one of a set of previously stored signals, utilize many basic principles of noise theory, regardless of whether the recognition system operates in a frequency- or time-domain mode. That is, each speech recognition system attempts to directly and/or indirectly characterize electrical signals as representative of actual speech corresponding to a particular command, speech which does not so correspond (breath noises, etc.), or noise.

In recognition systems having critical functions, such as those associated with effecting control of aircraft, problems associated with noise become paramount. These systems must not only achieve a high accuracy of command word recognition, but also must operate in a severe acoustical environment with substantial time-variant background noise.

To date, noise compensation techniques in known speech recognition systems have not substantially improved the recognition accuracy required for critical function systems. Many of these known systems inherently incorporate noise compensation principles merely in the means utilized to derive the feature signals representative of the input speech. That is, derivation of feature signals by either spectral frequency or time domain analysis methods may inherently compensate for certain types of noise. However, such methods do not provide adequate compensation for time variant and other types of noise. Furthermore, these recognition systems utilize equivalent methods of deriving feature signals representative of the unknown speech and the reference vocabulary of known commands. Accordingly, derivation of the feature signals does not compensate for differences between the acoustical environment in which the systems are actually utilized and the environment in which "training" of the systems to derive the vocabulary feature signals is accomplished.

Other means of noise compensation in known speech recognition systems employ noise "reduction" apparatus whereby various types of filtering methods are utilized to reduce noise components of the electrical signals representative of the actual speech prior to deriving the feature signals. Effectively, these methods attempt to increase the signal-to-noise (S/N) ratio of the incoming signals. However, practical improvement in the S/N ratio by these methods is typically limited to less than 10 db.

Another method of noise compensation for a system utilized in a severe acoustical environment is to "train" the system in a comparable environment. That is, "speaking" of the vocabulary commands and corresponding derivation of feature signals during construction of the reference word vocabulary is performed in the same acoustical environment that will exist during speech recognition (such as an aircraft cockpit while in flight), or in an equivalent simulated environment. However, certain types of noise, such as acoustical background noise, are time-variant in nature. Accordingly, it is not possible to predict or otherwise reproduce, at the time of speech during the training mode, the actual time-variant noise which will exist during a subsequent speech recognition mode.

Speech recognition systems utilizing one or more of the foregoing methods of noise compensation (or noise reduction) have one characteristic in common; namely, the feature signals representative of the actual speech and stored vocabulary commands are assumed to be substantially "noise free". That is, these systems do not perform feature signal comparison operations, or otherwise modify such comparison operations, based on the noise content of signals generated during the speech recognition mode.

SUMMARY OF INVENTION

In accordance with the invention, a technical advance is achieved in a recognition system for identifying unknown utterances spoken by an operator as one of a vocabulary of reference utterances, wherein sets of reference signals representative of the reference utterances are altered in accordance with noise estimation signals representative of acoustical background noise prior to comparing the reference signals with feature signals representative of the unknown utterances. The invention comprises a noise compensation arrangement adapted for use in a recognition system having storage means for storing the reference signals representative of a vocabulary of the reference utterances and comparator means for comparing the feature signals with the sets of reference signals, wherein the parameters of the feature signals correspond to the parameters of reference signals.

Input means are adapted to receive the unknown utterances spoken by the operator and noise estimator means are connected to the input means for generating the noise estimation signals representative of acoustical background noise occurring during the speaking of the unknown utterances. Compensation means are jointly responsive to the noise estimation signals and the sets of reference signals for altering the sets of reference signals in accordance with acoustical background noise prior to comparison of the signals with the feature signals.

Further, in accordance with the invention, the comparator means comprises means jointly responsive to the feature signals and the altered sets of reference signals for generating sets of probability density signals, wherein each set of probability density signals is a function of the feature signals and the altered reference signals representative of one of the reference utterances. Selection means responsive to the probability density signals select one of the reference utterances of the vocabulary of reference utterances as corresponding to the unknown utterances on the basis of the relative values of each of the sets of probability density signals.

The input means includes converting means for converting the unknown utterances and acoustical background noise into sequential analog signals. Signal conditioning means are responsive to the analog signals for sampling the signals at a predetermined sample rate and generating sample signals corresponding to the unknown utterances and the acoustical background noise. Feature extraction means are responsive to the sample signals representative of the unknown utterances for generating the feature signals and the noise estimator means are responsive to the sample signals representative of the acoustical background noise for generating the noise estimation signals.

The noise estimation means includes noise averaging means responsive to the sample signals representative of the acoustical background noise for generating statistical noise signals representative of cumulative averages of the acoustical background noise occurring prior in time. The feature extraction means includes means responsive to the sample signals representative of the unknown utterances for generating sets of linear prediction parameter signals, wherein the feature signals comprise the sets of parameter signals. The noise estimator means also includes means for generating the statistical noise signals in accordance with a time domain analysis of the sample signals representative of the acoustical background noise.

In accordance with one embodiment of the invention, the statistical noise signals include auto-correlation coefficient signals representative of the auto-correlations of the sample signals representative of the acoustical background noise. The feature extraction means includes means responsive to the sets of sample signals representative of acoustical background noise for generating additional feature signals representative of the background noise. The recognition system also includes boundary detection means responsive to the feature signals and the additional feature signals for detecting the beginning and end of unknown utterances and generating utterance boundary signals corresponding thereto. The noise estimator means includes means responsive to the utterance boundary signals for selecting from the sets of sample signals representative of acoustical background noise and unknown utterances only those sample signals representative of the acoustical background noise and generates the noise estimation signals in accordance therewith.

The compensation means includes means responsive to the noise estimation signals and the sets of reference signals for generating reference mean and reference variance signals for each of the reference utterances of the library of utterances. The means jointly responsive to the feature signals and the altered sets of reference signals is also responsive to the reference mean and variance signals for generating the sets of probability density signals.

The means for selecting the reference utterance corresponding to the unknown utterances includes means for selecting, from the sets of probability density signals, the set of probability density signals having the maximum relative value. Also included in a recognition system in accordance with the invention are means for selecting the known utterance corresponding to the maximum valued set of probability density signals and selecting this utterance as corresponding to the unknown utterances.

The feature extraction means also includes partitioning means for partitioning the sample signals into sequential frame signals, wherein each of the frame signals is representative of either the unknown utterance or acoustical background noise. The noise estimation means includes means for generating sets of the noise estimation signals, wherein each of the sets of noise estimation signals is representative of a different one of the frame signals representative of acoustical background noise. The sets of reference signals include subsets of the signals, wherein each of the subsets is representative of a different frame of the reference utterances. The compensation means includes means for modifying each of the subsets of reference signals in accordance with the sets of noise estimation signals.

A method in accordance with the invention for identifying unknown utterances spoken by an operator as corresponding to an utterance of a vocabulary of predetermined reference utterances includes the steps of storing sets of reference signals representative of differing utterances of the vocabulary reference utterances and generating feature signals representative of the unknown utterances. Noise estimation signals are generated representative of the acoustical background noise occurring during the speaking of the unknown utterance and the reference signals are altered in accordance with the noise estimation signals. The altered reference signals are compared with the feature signals and comparison signals representative of the result of the comparison are generated. An utterance of the vocabulary of reference utterances is selected as corresponding to the unknown utterance on the basis of the comparison signals.

The method in accordance with the invention also includes the steps of generating sets of probability density signals, wherein each set of the density signals is a function of the feature signals and the altered reference signals representative of one of the reference utterances. A maximum valued comparison signal is generated which corresponds to the maximum valued set of probability density signals and the reference utterance corresponding to the unknown utterances is selected on the basis of the maximum valued comparison signal.

The method also includes the steps of generating reference mean and reference variance signals as a function of the noise estimation signals and the reference signals for each reference utterance of the library reference utterances. The probability density signals are generated as a function of the feature signals and the reference mean and reference variance signals.

BRIEF DESCRIPTION OF THE DRAWINGS

A preferred embodiment of the invention will be described with reference to the accompanying drawings in which:

FIG. 3 is a diagram symbolically illustrating the relationship between noise and vocal word commands spoken by the operator in accordance with the detection of word boundaries by the speech recognition system depicted in FIG. 1;

DISCLOSURE OF THE INVENTION

Figure 1:
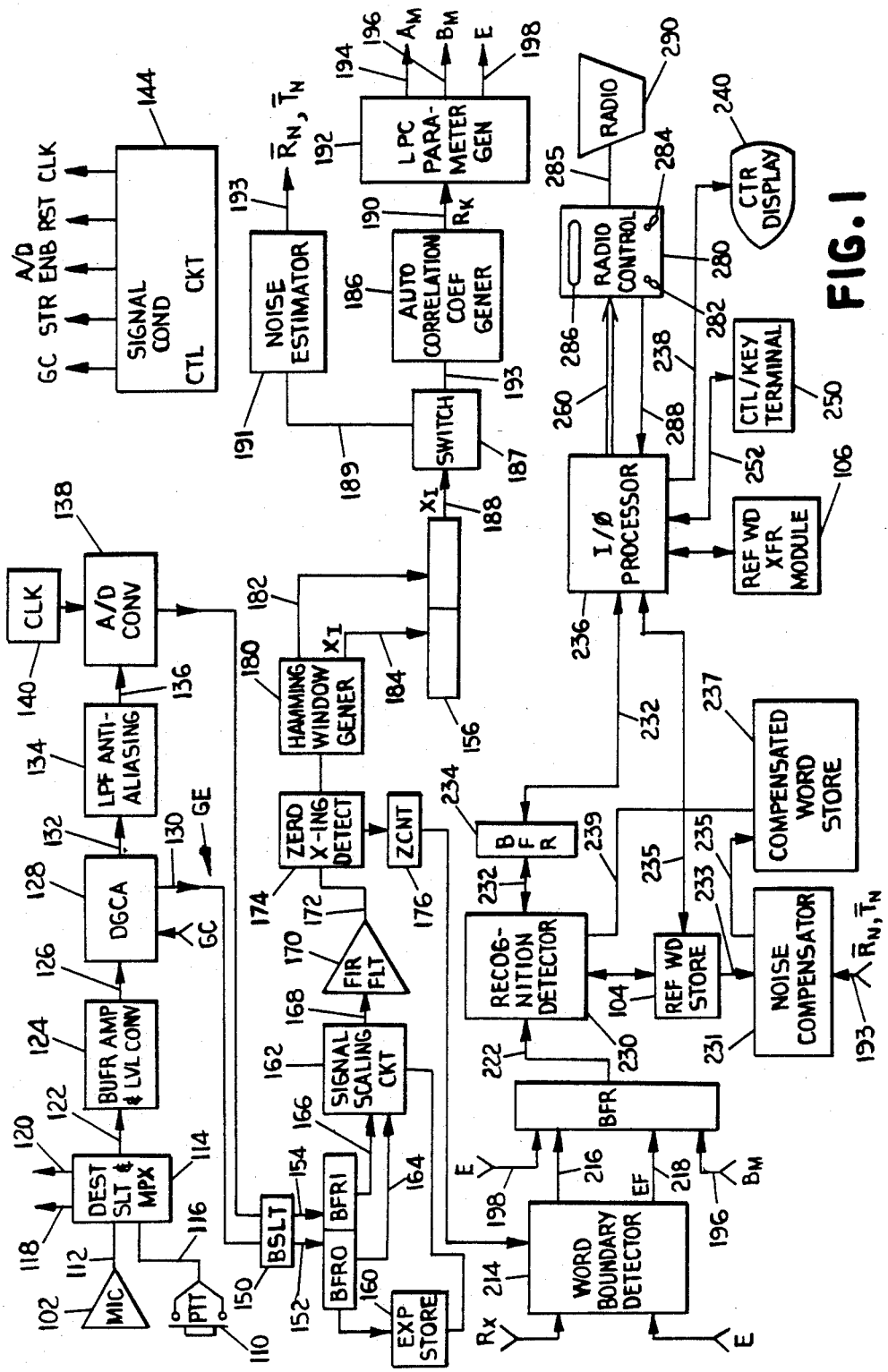
FIG. 1 is a block diagram of a speech recognition system in accordance with the invention.

The principles of the invention are disclosed, by way of example, in a recognition system 100 as depicted in FIG. 1. The system 100 is an "isolated discrete utterance" recognition system whereby "unknown utterances" spoken by an operator and applied to microphone input circuitry 102 are detected in isolation and compared with a library comprising a limited vocabulary of reference utterances which are stored as representative electrical signals in reference store 104. The isolated discreet utterance can be an individual spoken word or a set of words comprising a command sequence, i.e., a series of "connected" words. If an isolated spoken utterance is characterized as "matching" one of the library utterances, particular signals are applied to output interface transmission lines 238 and 260, the signals being indicative of identification having occurred. Although not illustrated or described in detail herein, it is apparent that the identification signal can be utilized in the same manner as any other switching signal, e.g. for purposes of controlling various types of apparatus such as within an aircraft. The utilization of the "discrete-utterance" approach provides extremely high reliability of identification. Such reliability is a necessity in, for example, an aircraft or similar environment where an erroneous identification can have severe consequences.

The recognition system 100 basically operates in two modes, namely a "training" mode where the library of reference utterances is established within store 104, and a "recognition" mode whereby unknown utterances spoken by the operator are compared to the reference utterances. The recognition system 100 is not speaker "independent." That is, system 100 is adapted to recognize unknown utterances spoken by a particular operator whereby the reference utterances against which the unknown utterances are compared have also been spoken by the same operator during a training mode. However, the noise compensation arrangement in accordance with the invention and exemplarily described herein is not limited to use with speaker dependent systems and can readily be applied to speaker independent systems.

Excepting the noise compensation arrangement which forms the basis for this invention as subsequently described herein, the principles and operation of system 100 are described in detail in the commonly assigned Eckley U.S. patent application Ser. No. 302,175, filed Sept. 14, 1981. It should be emphasized that although system 100 utilizes time-domain analysis principles and linear prediction parameters, the principles of the invention are not limited to the same. That is, as will be apparent from the subsequent description herein, the noise compensation principles of the invention can readily be applied, for example, to a speech recognition system which employs frequency-spectrum analysis.

The speech recognition system 100 will now be described in detail with respect to FIG. 1. The training mode of the recognition system 100 can be broken down into two separate modes. In one mode, the operator directly speaks into the microphone circuitry 102 so as to establish the vocabulary of reference utterances directly within reference word store 104. If desired, the established reference utterances can then be retrieved from store 104 and stored on a portable means such as reference utterance transfer module 106 depicted in FIG. 1. Correspondingly, subsequent storage of the reference utterances within store 104 can then be accomplished by transmittal of the information from transfer module 106 directly to store 104 through I/O processor circuit 236 and transmission line 235. Accordingly, an operator need only establish a library of reference utterances corresponding to his/her voice once by direct input into the microphone system 102. Thereafter, the library of reference utterances for that particular operator can be readily retrieved from transfer module 106 and stored in store 104. The transfer module 106 can be any suitable type of portable storage means, such as a conventional magnetic tape cassette.

In the basic storage mode of operation within the training mode, the operator can initialize recognition system 100 by merely loading the previously created library of reference utterances from transfer module 106 into store 104 through processor circuit 236 and transmission line 235. Following this initialization procedure, the recognition system 100 is able to recognize the particular operator's unique speech patterns. When the actual training mode is initialized, the recognition system 100 must perform the functions of establishing a table of contents for the particular library of reference utterances, create a composite or "best example" of each library utterance from a plurality of repetitions of the utterance by the operator, and store the table of contents and library reference utterances on the transfer module 106.

The table of contents for a particular library of reference utterances can be established by either direct manual input from keyboard 250 or by transmittal of the table of contents from the transfer module 106. When the table of contents has been correctly established, it can be saved on module 106 for subsequent use. Following the establishment of the table of contents, the recognition system 100 can also create a composite of each reference utterance by interactively prompting the operator for several repetitions of the utterance. When a composite has been established, the electrical signals corresponding to the composite utterance can also be stored on the transfer module 106 for subsequent use. The particular procedures associated with storage of electrical signals in reference store 104 in correspondence to a desired vocabulary of reference utterances will be better understood after detailed description of the operation of recognition system 100 for recognizing an unknown utterance as one of the stored reference utterances.

The circuitry depicted in FIG. 1 is operative both in the aforedescribed training mode to store electrical signals representative of a library comprising a limited vocabulary of reference utterances within reference store 104, and in a recognition mode for identifying an unknown utterance as one of the vocabulary of reference utterances. To best describe the operation of reference system 100, the circuitry depicted in FIG. 1 will be described initially with respect to the recognition or nonrecognition of an unknown utterance of an operator subsequent to storage of reference utterances unique to the operator's speech pattern within store 104. The particular procedures for storing these reference utterances with reference to the circuitry of recognition system 100 will become apparent from such description.

The unknown utterances of the operator are spoken into the microphone circuit 102. However, to avoid detection and attempted recognition of stray noise when the operator does not desire to generate a voice command, system 100 includes a "push-to-talk" (PTT) switch 110 whereby recognition operations of the system 100 are not performed unless the PTT switch 110 is activated by the operator simultaneously with the speaking of a voice command. It should also be noted that activation of recognition operations can be accomplished by signals applied to and transmitted from I/∅ processor 236.

When the PTT switch 110 is activated and the operator transmits a voice command into microphone circuit 102, electrical signals corresponding to the operator's voice command are transmitted on line 112 and applied to a destination selector and multiplex circuit 114. The activation signal from the PTT switch 110 is also transmitted to the selector and multiplex circuit 114 by means of transmission line 116.

The destination-selector and multiplex circuit 114 is a conventional circuit for multiplexing the input signals from microphone 102 and PTT switch 110. Further, however, circuit 114 also provides optional transmission paths 118 and 120 for the resultant multiplexed signals. Accordingly, the recognition system 100 provides a means of optionally transmitting electrical signals corresponding to the operator's voice command to circuitry other than the circuitry shown in FIG. 1 for recognizing the voice command as one of a predetermined vocabulary of reference words. For example, if system 100 is utilized in an aircraft, the microphone circuit 102 can operate as both an input means for the operator's voice command and, for example, as a microphone circuit associated with a speaker system throughout the aircraft. The particular destination of the operator's voice command can be determined by manual or other types of input to the destination selector circuit 114.

Assuming that destination selector circuit 114 has been activated in a manner so as to cause the recognition system 100 to identify the operator's voice command, the resultant multiplexed voice signal from the operator is transmitted on output transmission line 122 and applied as an input signal to the buffer amplifier and level converter circuit 124 as depicted in FIG. 1. The amplifier and converter circuit 124 provides isolation of the input signal on line 122 (corresponding to the operator's voice command from the resultant output signals from circuit 124). Further, the converter circuit 124 converts the two-state electrical signal corresponding to the PTT switch 110 and the analog voice signal corresponding to the operator's voice command to appropriate signal levels for further transmittal through circuitry of recognition system 100. For example, the circuit 124 can comprise conventional and well-known transformer isolation components whereby the input impedance and signal-level range may be 600 ohms and −52 to +3 dBm, respectively.

The resultant isolated and appropriately level-converted analog output signal from circuit 124 is applied on transmission line 126 as an input signal to a digital gain-controlled amplifier 128. The controllable amplifier circuit 128 is responsive to both the level-converted analog voice signal on transmission line 126 and a gain-control signal GC applied as an input signal thereto for selectively modifying the gain of the analog input voice signal. In physically realizing the controllable gain amplifier 128, the input voice signal from line 126 is actually attenuated in accordance with the value of signal GC. The time variant attenuation is characterized as a gain exponent signal GE and is transmitted as an output signal on line 130. The detailed operation of controllable gain amplifier 128, the means of obtaining the gain-control signal GC and the resultant utilization of gain exponent signal GE are described in subsequent paragraphs herein. The gain-control signal GC can be, for example, an 8-stage signal capable of modifying gain in −6 dB increments. Further, the gain of amplifier circuit 128 is adapted to be modified in a time variant manner only when the analog voice signal from transmission line 126 is below a predetermined magnitude, thereby avoiding gain switching noise caused by transient signals. Still further, to compensate for conventional filter delay time periods, the gain exponent signal GE is generated a predetermined period of time after the gain of amplifier circuit 128 is actually modified.

The resultant attenuated analog voice signal from the controllable gain amplifier circuit 128 is generated on transmission line 132 and applied as an input signal to a low-pass anti-aliasing filter circuit 134. Filter circuit 134 is conventional in design and is utilized to prevent high-frequency noise signals from "folding over" into lower frequency signals after subsequent analog-to-digital (A/D) sampling of the voice signal is accomplished. The design of the filter circuit 134 can, for example, actually comprise three separate filter components. Specifically, a first analog filter can be of itself an anti-aliasing filter for the sharp cut-off digital filter which follows it in function. The output of this first analog filter can then be applied to a digital filter which provides the sharp frequency cut-off and then further applied to a second analog filter for removing high-frequency noise contributed by the digital filter. The composite filter circuit 134 thereby provides a sharp cut-off audio filter with a low-noise spectrum and a linear-phase characterization. The parameters of such a composite filter can be, for example, a band width having a −3 dB level at approximately 3200 Hz and a −40 dB level at approximately 4000 Hz. The phase linearity of the filter preserves the integrity of the analog voice signal, since the analog signal tends to be transient in nature.

The resultant filtered signal is transmitted on line 136 and applied as an input signal to a conventional A/D converter circuit 138. The A/D converter circuit 138 is conventional in structure and function and can be utilized to sample the analog signal at a rate determined by a clock input signal to converter circuit 138 from a conventional clock circuit 140. For example, the clock can provide a conventional squarewave strobe at 6.67 MHz, and the sample rate of the converter circuit 138 can be selected at a value of 8 kHz. Accordingly, the converter circuit 138 thereby provides a sample of the analog voice signal on transmission line 136 periodically each 124.8 microseconds. This sample signal can utilize 2,048 levels, thereby requiring a data channel having a 12-bit width (including a sign bit). This resultant sample signal is then applied as an output signal on transmission line 142 as depicted in FIG. 1.

In accordance with the foregoing description, the microphone circuit 102 and PTT switch 110 can be characterized as an input means for converting an operator's voice command into electrical analog voice signals corresponding to the operator's speech pattern. Similarly, the combination of selector and multiplexer circuit 114, amplifier and converter circuit 124, controllable gain amplifier 128, anti-aliasing filter 134 and A/D converter circuit 138 with accompanying clock circuit 140 can be characterized as a signal conditioning means for converting the electrical analog voice signals into digital signals corresponding to the operator's spoken voice command. Control of functional timing of the circuitry herebefore described can be accomplished by any conventional means well known in the art of circuit design. A signal conditioning control circuit 144 is functionally depicted in FIG. 1 as a means for providing requisite control signals for the circuitry described above. Control circuit 144 provides the gain control signal GC applied to controllable gain appilfier circuit 128 to provide a time-variant attenuation signal of the analog input signal. The signal STR depicted in FIG. 1 as applied from control circuit 144 provides a strobe signal to the converter circuit 138. Similarly, the A/D ENB signal is utilized to enable the converter circuit 138. The control signal CLK is merely symbolic of the output signal from clock circuit 140 which is utilized as an input clock signal to converter circuit 138. Reset signal RST provides a means for resetting clock 140 and the signal conditioning circuitry controlled thereby.

The combination of the gain exponent signals GE on transmission line 130 and the sampled voice signals generated on transmission line 142 from converter circuit 138 can be characterized in combination as "floating point" digital speech sample signals wherein the signal GE is a signal "exponent" and the sampled signal transmitted from A/D converter circuit 138 is a "fractional" component of the voice signal. Both signals can be generated at equivalent rates in synchronization and comprise composite voice signal samples.

The sequential voice signal samples from the signal conditioning circuitry are subsequently processed by other circuits within recognition system 100 in the format of speech "frames," each frame consisting of a predetermined number of consecutive speech samples. However, to obtain a high reliability with respect to identification of the operator's spoken command, and in accordance with the invention, the speech frames are overlapped so that a predetermined number of speech samples in a particular frame correspond to an equivalent number of samples in the next consecutive frame. For example, a 50% overlap between the speech frames can be utilized with each frame comprising 256 consecutive speech samples. Accordingly, the last 128 samples of a frame are also utilized as the first 128 speech samples of the next consecutive frame.

To accomplish this overlap, the speech samples from transmission lines 130 and 142 are both applied to a buffer select circuit 150. Select circuit 150 is utilized to selectively transmit the speech samples into one of two buffers BFR0 and BFR1, each comprising 128 speech sample storage locations. As the speech samples are applied to the buffers, buffer BFR0 is first filled. After BFR0 has been filled, buffer select circuit 150 is operable to transmit following speech samples to buffer BFR1. The selective transmission is functionally depicted in FIG. 1 as being accomplished over either of transmission lines 152 or 154. When both buffers have a composite of 256 speech sample signals, buffer BFR0 then transfers the first half of a 256 speech sample signal to a speech sample frame location buffer 156. After buffer BFR0 has transferred the first half of the sample signals to buffer 156, buffer BFR1 then transfers the second half of the sample signals to buffer 156. As depicted in FIG. 1, the speech samples from buffers BFR0 and BFR1 are not transmitted directly to buffer 156 but are first transmitted through preprocessing circuits described hereinafter. It should be noted that numerous other types of procedures for partitioning the voice signal samples can be utilized.

It is apparent from the foregoing description that additional circuitry is required for performing certain of the timing functions between the aforedescribed signal conditioning circuitry and the buffering circuitry. For example, the buffering procedure heretofore described must be initiated each time a new speech sample signal is transmitted from the converter circuit 138 and the controllable gain amplifier 128. It is therefore apparent that the means utilized to perform the buffering procedure must accomplish the procedure within a predetermined duration of time dependent upon the timing of clock circuit 140 and the corresponding application of digital speech sample signals on transmission line 142 from converter circuit 138. Furthermore, it is also readily apparent that various means can be utilized to "point" the buffer select circuit 150 and accompanying circuitry to the required sample locations within buffers BFR0 and BFR1. That is, if the time period necessary for accomplishing the buffering procedure would exceed a certain period of time, the sample signals applied from converter circuit 138 and controllable gain applifier 128 may override sample signals within buffers BFR0 and BFR1 prior to their transmittal through subsequent processing circuitry.

For reasons subsequently discussed herein, the largest valued signal of the gain exponent signals GE within either of buffers BFR0 or BFRI at a particular time is "saved" within a memory location of exponent store 160. As subsequently described herein, the signal stored in exponent store 160 is utilized during scaling procedures associated with the speech sample signals.

The speech sample signals from buffers BFR0 and BFR1 are applied as input signals to signal scaling circuit 162 by means of transmission lines 164 and 166, respectively. The necessity for scaling the speech sample signals corresponding to a frame signal is that a modification in the gain applied to controllable gain amplifier 128 by means of signal GC may have occurred during transmittal of the speech sample signals into the buffers BFR0 and BFR1 corresponding to the particular frame signal. The speech sample signals corresponding to the frame signal must therefore be adjusted to have equal scaling before further recognition processing can be performed.

An exemplary procedure for performance of the scaling by circuit 162 is to compare the attenuation exponents of each of the incoming speech samples with the largest attenuation exponent previously stored in exponent store 160. The incoming speech samples on transmission lines 164 and 166 can be "shifted" (i.e. digitally multiplied or divided by a factor of 2, 4, 8, etc.) by a value determined by the difference between the particular sample attenuation exponent and the largest attenuation exponent found in the samples of the frame signals as determined by the value of the signals stored in exponent store 160. In accordance with the foregoing, the resultant frame signal applied on output transmission line 168 therefore comprises scaled speech sample signals, each having an attenuation exponent corresponding to the largest exponent of the samples as they were applied to buffers BFR0 and BFR1.

The resultant frame signal comprising scaled speech sample signals on transmission line 168 is applied as an input signal to a "finite impulse response" (FIR) high-pass filter circuit 170. Filter circuit 170 can be, for example, a digital high-pass filter circuit which provides requisite "emphasis" of higher-frequency components of the frame signal so that such components are more substantially equivalent in magnitude to lower-frequency components. Filter circuit 170 also removes the "zero frequency" or DC component from the frame signal applied to line 168. An exemplary implementation of digital filter 170 can provide an output signal on transmission line 172 whereby the filtered output frame signal comprises individual signals having levels corresponding to the difference in levels between an input sample signal and a corresponding next-previous input sample signal. Accordingly, it is apparent that filter circuit 170 requires a means for storing the speech signal samples from the previously processed frame signal. Furthermore, a predetermined "dummy" level of incoming speech samples must be postulated in order to process the sample signals of the first frame signal.

Following pre-emphasis of the voice signal, the processed frame signal is transmitted on line 172 and applied as an input signal to a Hamming window generator circuit 180. The Hamming window generator 180 provides a well-known method for performing additional low-pass filtering on the frame signal without causing the resultant output signal to be substantially constant. That is, the Hamming window provides a band pass having substantial attenuation outside of the pass band without substantially affecting the time-dependent energy representation reflecting the amplitude variations of the frame signal. The application of the Hamming window to each of the speech sample signals of the frame signal reduces time domain discontinuities at the beginning and end of the frame signals. The concept of applying a Hamming window function to electrical signals representative of speech patterns is well known in the art of speech recognition system design and a description of this concept can be found on pages 120-130 in the text by Rabiner and Schafer entitled *Digital Processing of Speech Signals*, Prentice-Hall (1978).

The Hamming window can be defined as an array $W_i$ whereby i is representative of the particular speech sample within a frame signal. If the frame signals are selected to comprise 256 speech sample signals, i will have a range from 1 to 256. The Hamming window function values are then defined as follows:

$$w(i) = 0.54 - 0.46 * \cos(2(i-1)/255) \qquad (1)$$

Each element of the Hamming window array is multiplied by a corresponding speech sample element of the frame signal array. For purposes of subsequent description, the resultant frame signal array is shown as $X_i$ in FIG. 1 and the speech sample signals therein are transmitted on lines 182 and 184 to the 256 speech sample signal location buffer 156. Transmission of these speech samples on line 182 causes the samples to be stored in the second half of buffer 156. Correspondingly, transmission of the speech samples on line 184 causes storage within the first half of buffer 156. The selection of the particular half of buffer 156 in which to store the signals is made in accordance with the buffering procedure previously described herein.

The heretofore described signal scaling circuit 162, finite impulse response filter circuit 170 and Hamming window generator 180 comprise a signal preprocessing means for formatting the incoming speech sample signals into a frame signal characterized as an array $X_i$ whereby the elements of the frame signal array comprise the processed speech sample signals. The preprocessing operations as previously described format the array $X_i$ for input to linear prediction coefficient (LPC) operations whereby digital parameter signals are generated which represent prediction parameters of the speech frame signals.

The frame signals $X_i$ stored in buffer 156 are "functionally" applied as input signals to a switch circuit 187 by means of transmission line 188. Circuit 187 is a functional switch which can be realized by computer programming means and is controlled by signals on transmission lines 216, 218 generated by word boundary detector circuit 214 subsequently described herein. The signals on lines 216, 218 correspond to boundaries between frame signals corresponding to noise and those signals corresponding to the operator's spoken utterance. The switch circuit 187 represents the system's capability of differentiating between frame signals corresponding to acoustical background noise and frame signals corresponding to actual speech. This concept will become apparent from subsequent description herein.

The frame signals $X_i$ are applied through the switch circuit 187 to transmission line 189 and thereon are applied as input signals to auto-correlation coefficient generator 186. The coefficient generator 186 generates an array of well-known and conventional auto-correlation coefficient signals $R_k$ in the format of a unitary array having k elements. The number of element signals k is also characterized as the "order" of the prediction parameter signals herein described. The auto-correlation coefficient signals $R_k$ are obtained in accordance with the following equation:

$$R(k) = \sum_{i=1}^{N-k} [X(i) * X(i + k)] \qquad (2)$$

where N is the number of speech sample signals within the frame signal array, i.e. 256 in the exemplary recognition system 100 described herein.

The concept of generating signal auto-correlation coefficient signals within speech or speaker recognition arrangements is well known in the art and is described, for example, in the U.S. Pat. No. 4,032,711, to Sambur issued June 28, 1977, and in the commonly assigned Eckley patent application. It will be apparent to those skilled in the art that computation of the autocorrelation coefficient signals $R_k$ and other parameter signals generated as subsequently described herein can be performed by means of microprocessors or similar types of conventional computers. Accordingly, a representative Fortran computer program for such computations is illustrated in Appendix B. The auto-correlation coefficient signals $R_k$ can also be appropriately scaled to include the effects of the controlable gain amplifier attenuation, application of the Hamming window, multiplication of one scaled speech sample signal by another scaled sample signal and the previously described shift normalization of the speech samples.

The frame signals $X_i$ are also applied through switch circuit 187 to transmission line 191, whereby the frame signals are applied as input signals to a noise estimation circuit 193. The noise estimation circuit 193 is utilized as a means to continuously monitor acoustical "background" noise of the physical system environment. The circuit 193 is responsive to the frame signals $X_i$ to generate a set of noise estimation signals on transmission line 195 representative of the acoustical background noise.

It should be emphasized that various types of signals can be generated which represent acoustical background noise. In addition, various criteria can be utilized to determine which of frame signals $X_i$ correspond to spoken utterances by the operator (or breath "pauses" or the like) and which of signals $X_i$ correspond to background noise. As an illustrative example of signals representative of noise in accordance with the invention, the output signals on transmission line 195 can comprise noise auto-correlation coefficient signals $R_n$ and signals representative of elements of a conventional Töeplitz matrix $T_n$.

However, signals representative of individual frames of noise do not, in and of themselves, provide a substantial amount of noise content information. The characteristics of the acoustical background noise which are of importance are those characteristics representative of cumulative background noise. Accordingly, the noise estimator circuit is adapted to generate sets of "average" auto-correlation coefficient signals which represent average values of the individual elements of auto-correlation coefficient signals for the noise frames occurring prior in time to the derivation of the average signals. These average value signals for the auto-correlation coefficient signals $R_n$ and Töeplitz matrices $T_n$ will be designated $\bar{R}_n$ and $\bar{T}_n$, respectively. These average signals $\bar{R}_n$ and $\bar{T}_n$ can be characterized as statistical noise signals corresponding to average values of the signals representative of individual frames of the acoustical background noise.

The auto-correlation coefficient signals $R_n$ are obtained in accordance with operations as set forth in Equation 2 but only those signals $R_n$ corresponding to noise frames are utilized to compensate reference parameter signals as subsequently described herein. The Töeplitz matrix is well-known and auto-correlation coefficient signals represented as elements therein appear as follows:

$$T_n = \begin{vmatrix} R_n(0) & R_n(1) & R_n(2) & \ldots R_n(k-1) \\ R_n(1) & R_n(0) & R_n(1) & \ldots R_n(k-2) \\ \vdots & & & \\ R_n(k-1) & R_n(k-2) & R_n(k-3) & \ldots R_n(0) \end{vmatrix} \quad (3)$$

Again, it should be emphasized that other signals representative of noise can be utilized without departing from the scope of the invention. For example, in a speech recognition system utilizing frequency-domain analysis for obtaining feature signals, signals representative of noise can be in the format of an overall power spectrum or power spectral magnitudes within the desired frequency bandwidth.

Returning to those signals representative of spoken utterances, the resultant auto-correlation coefficient signals $R_k$ are applied on transmission 190 as input signals to a linear prediction coefficient (LPC) parameter generator 192. The LPC parameter generator 192 computes various linear predictive coefficient signals. In the particular embodiment described herein, the coefficient signals from parameter generator 192 include partial correlation (PARCOR) coefficient signals and signals commonly referred to as predictor signals a computed as R/T where R is an array of autocorrelation coefficient signals and T is representative of the Toeplitz matrix. However, it should be emphasized that other types of linear prediction coefficient signals can be utilized. In addition, the concepts of the invention do not require any LPC analysis. That is, feature signals obtained through a spectral frequency analysis or the like can also be utilized.

Figure 2:
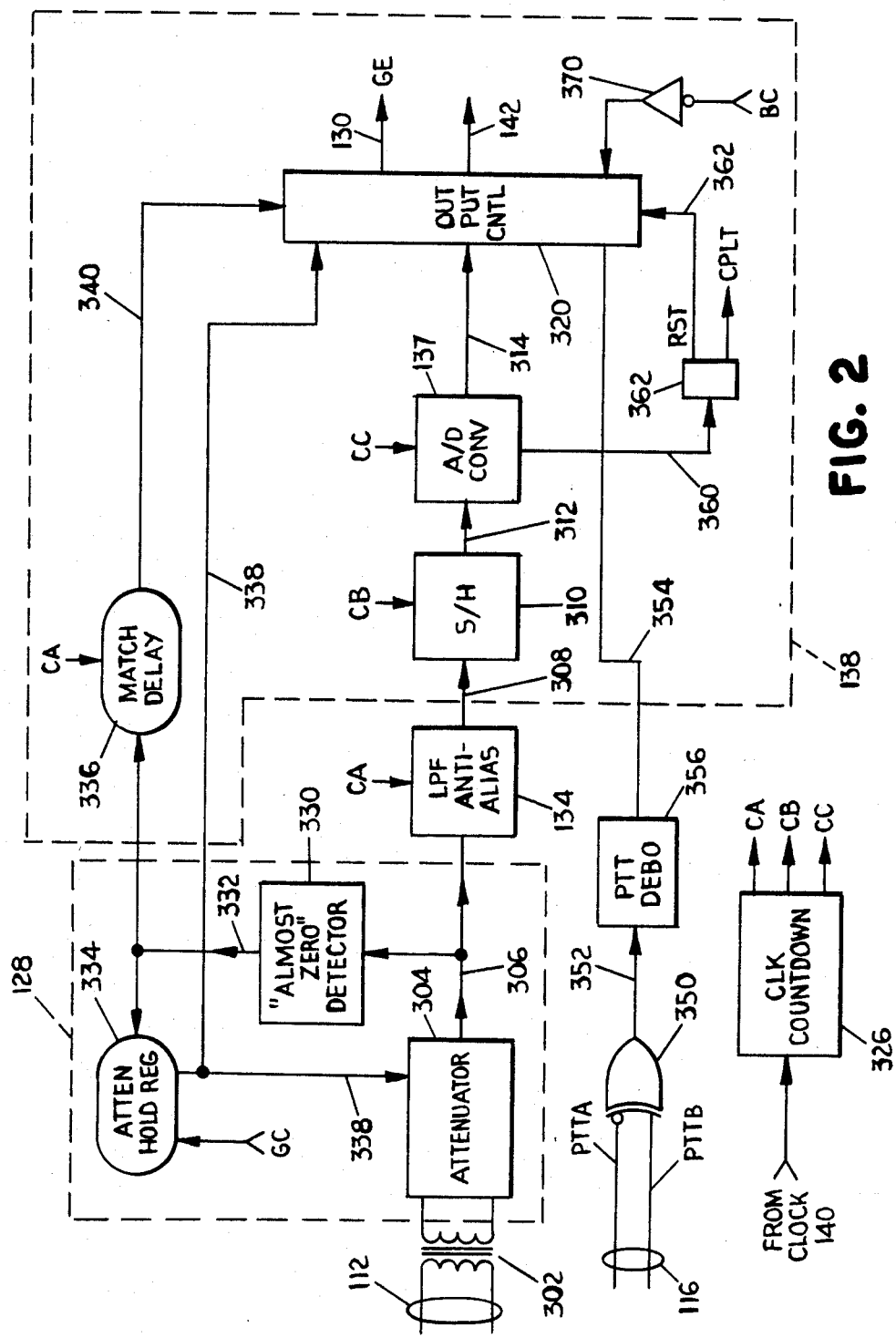
FIG. 2 is a detailed diagram of exemplary signal conditioning circuitry of the recognition system depicted in FIG. 1.

As illustrated in FIG. 2, the resultant output signals from the LPC generator 192 include an array of partial correlation (PARCOR) coefficient signals $B_m$ and a predictor error signal E for each frame signal, the signals being depicted in FIG. 1 as output signals transmitted on lines 196 and 198, respectively. The PARCOR coefficient signals $B_m$ comprise arrays of signals having an order m and are well known in the art of speech prediction analysis. It is apparent that digital computer means can be utilized within the parameter generator 192 to compute the linear prediction coefficient parameter signals. Accordingly, and for purposes of understanding, a representative Fortran computer program for computation of the coefficient signals is included herein as Appendix A. It should also be emphasized that scaling adjustments can be utilized during computation of the coefficient signals, though such adjustments have been omitted from the Appendix A program for purposes of clarity and understanding.

The auto-correlation coefficient signals $R_k$, predictor error signal E and output signals from impulse response filter circuit 170 on conductor 172 are applied as input signals to boundary detection circuit 214. Detection circuit 214 is responsive to the aforedescribed input signals for statistically determining the frame signals corresponding to the beginning and end of the voice command spoken by the operator. It should be emphasized that the recognition system 100 in accordance with the invention is an "isolated" speech recognition system whereby each utterance of the operator's voice command must be separately identified.

The concept of utterance boundary detection is well known in the art of speech recognition system design. For example, one particular type of boundary detection circuit is described in the Rabiner et al U.S. Pat. No. 4,092,493, issued May 30, 1978. A detailed description of the utterance boundary detector circuit 214 is provided in subsequent paragraphs. However, it can be summarily described as utilizing signals indicative of speech energy (which can correspond to the zeroth order auto-correlation coefficient signals) and predictor error to determine the boundaries between frame signals corresponding to the operator's spoken utterance. That is, detector circuit 214 is adapted to determine the boundary between frame signals corresponding to the spoken utterances and frame signals comprising "noise." The output signals of detector circuit 214 comprise a signal BF applied on transmission line 216 and a signal EF applied on transmission line 218. The signal BF comprises information indicative of the first frame signal corresponding to the beginning frame of the isolated voice command utterance. The signal EF is indicative of the frame signal corresponding to the end frame of the isolated voice command word.

As previously described, the signals BF and EF are functionally applied as input signals to the noise estimator circuit 191. Estimator circuit 191 utilizes the utterance boundary signals to differentiate between those components of frame signals $X_i$ representative of speech, i.e. the signals corresponding to frames between the beginning and end frames, from those components of frame signals $X_i$ representative of acoustical background noise. The auto-correlation coefficient signals $\bar{R}_n$ and $\bar{T}_n$ are generated only for the frames representative of acoustical background noise.

As previously described, the actual output signals $\bar{R}_n$ and $\bar{T}_n$ from noise estimator circuit 191 represent a cumulative average of the auto-correlation coefficient signals $R_n$ and $T_n$ for each frame representative of the acoustical background noise. These signals are characterized as statistical noise signals obtained by continuous monitoring of the acoustical background noise. It should be noted that although these signals in recognition system 100 comprise signals corresponding to averages of auto-correlation coefficient signals, other recognition systems in accordance with the invention and which utilize frequency domain analysis could generate noise estimation signals representative of statistics of a power spectrum or power spectral points over a desired frequency bandwidth.

Each of the signals BF and EF on transmission lines 216 and 218, respectively, is also applied as an input signal to a buffer circuit 220. Also applied as signals to the buffer circuit 220 are the predictor error signal E from transmission line 198 and the partial correlation (PARCOR) coefficient signals $B_m$ from transmission line 196. Buffer circuit 220 is utilized to store the aforedescribed signals and provide a means for buffering signals generated by the previously described linear prediction coefficient circuitry and the pattern recognition circuitry to be subsequently described herein.

The aforementioned signals applied to buffer circuit 220 are thereafter applied to pattern recognition detector circuitry 230 through transmission line 222. The pattern-recognition detector circuitry 230 is adapted to compare feature signals corresponding to the frame signals between beginning and end frames represented by signals BF and EF for the operator's isolated command utterance with corresponding reference signals representative of the library of reference utterances as stored in reference word memory store 104. Each of the sets of electrical signals corresponding to each of the reference utterances is functionally "compared" with equivalent signals corresponding to the isolated spoken utterance. Based on the result of the particular comparison procedure utilized, the recognition detector circuitry 230 transmits an output signal on transmission line 232 representative of either an acceptance or a rejection of the operator's spoken voice command utterance as one of the library of reference utterances stored in memory store 104. As apparent to those skilled in the art of speech recognition design, the detector circuitry 230 can also transmit other signals on line 232 representative of the particular spoken utterance.

The output signals from the recognition detection circuitry 230 are stored in a buffer circuit 234 and can then be applied to an input/output (I/O) processor circuit 236. Processor circuit 236 provides an input/output interface for the operator, the recognition system 100 and any apparatus to be controlled in accordance with the voice command utterances spoken by the operator. The types of functions which can be performed by processor circuit 236 can include, for example, a visual display to the operator of the particular utterance of reference utterances stored in memory store 104 which the recognition system 100 has determined corresponds to the command utterance spoken by the operator.

Signals corresponding to this functional display can be transmitted from processor circuit 236 on transmission line 238 to a cathode ray tube (CRT) display apparatus 240 as depicted in FIG. 1. Of course, signals indicative of the recognition system 100 rejecting the spoken command utteranceas corresponding to any of the library of reference utterances can also be transmitted to the operator via display apparatus 240.

Input signals to recognition system 100, other than the spoken voice commands by the operator which are applied through microphone 102, can be applied to processor circuit 236 by means of a control/keyboard terminal 250 connected through a bidirectional transmission line 252 to the processor circuit 236. The keyboard terminal apparatus 250 can be utilized to supply any desired control commands to the recognition system 100 and can further be utilized to control storage of electrical signals representative of reference utterances in memory store 104 or storage of such reference utterances in the reference utterance transfer module 106 when the recognition system 100 is in a training mode.

The command corresponding to identification of a particular spoken command utterance can be applied to any desired apparatus through a transmission line 260. One particular application of the recognition system 100 is use as a "voice interactive" system enabling a pilot to control aircraft avionic systems by speaking keywords instead of, for example, manually activating push-button/toggle switches. For example, and as depicted in FIG. 1, the transmission line 260 may be connected to an aircraft radio frequency control assembly 280 which, in turn, is connected through a transmission line 285 to an aircraft radio 290. As conventionally operated by the pilot, the radio control assembly 280 can include toggle switches 282 and 284 for manually modifying the frequency channel of aircraft radio 290. A visual display of the present radio frequency channel can be generated in display unit 286 also included with the control assembly 280.

In conventional operation, the pilot may desire to decrease the existing channel frequency of aircraft radio 290 and toggle switch 282 may be selectively actuated to sequentially decrease the radio frequency until the desired channel is displayed on display unit 286. Similarly, if the aircraft radio frequency is to be increased, the pilot can operate toggle switch 284, the switch 284 being operable in a manner similar to that of switch 282.

In accordance with a particular application of the invention, the radio control assembly 280 can be adapted to accept input signals through command control transmission line 260 from the I/O processor circuit 236. If the pilot desires, for example, to modify the radio frequency to a different channel represented by a frequency "UHF 225.9", the pilot may speak such a command into the microphone circuit 102. If the command is correctly spoken so as to be recognized by the recognition system 100, the I/O processor 236 can be adapted to apply command signals on transmission line 260 in a manner so as to adjust the frequency of aircraft radio 290 to the desired channel. Processor circuitry 236 can determine when the desired radio frequency has been achieved by means of feedback signals applied from control assembly 280 on transmission line 288. Correspondingly, the recognized voice command for changing the radio frequency can be displayed to the pilot on CRT display 240 by means of signals applied from processor circuit 236 on transmission line 238. It will be apparent to those skilled in the art of speech recognition system design and avionics systems that numerous other specific applications of voice commands can be utilized for pilot functions associated with an aircraft. For example, voice commands can be utilized for modifying aircraft headings and similar functions where manual operations by the pilot have heretofore directly or indirectly generated particular electrical signals for performance of the avionic functions. It will also be apparent to those skilled in the art of control system design that the command sequence signals on line 260 can be applied to numerous other types of apparatus to control the operations thereof.

A more detailed block diagram of the signal conditioning circuitry previously described with respect to FIG. 1 is depicted in FIG. 2. As illustrated therein, the analog input signal on transmission line 112 from microphone circuitry 102 previously described with respect to FIG. 1 is applied through an isolation transformer 302 to a controlled gain attenuator circuit 304. The attenuator circuit 304 can be an eight-state gain control attenuator wherein the resultant attenuator signal is applied on transmission line 306 to the low-pass anti-aliasing filter circuit 134 previously described with respect to FIG. 1. The filtered output signal from circuit 134 is applied on transmission line 308 to a "sample-and-hold" circuit 310 which applies a desired sampled speech signal to line 312 as an input signal to A/D converter circuit 137. The resultant digital speech signal is thereafter applied on transmission line 314 to an output control circuit 320.

The clocking signal from clock 140 described with respect to FIG. 1 is applied through a clock countdown circuit 326 having three clock output signals of separate frequencies and labeled clock signals CA, CB and CC in FIG. 2. These clock signals are selectively applied to the antialiasing filter circuit 134, sample-and-hold circuit 310 and A/D converter circuit 137 to correctly time the functions performed thereby.

The attenuated speech signal on transmission line 306 is also applied to an "almost-zero" detector circuit 330 which is utilized to insure that the attenuator state of circuit 304 is not modified when the analog voice signal is above a predetermined magnitude. This detection arrangement avoids attenuation-switching noise which may be caused by transient signals associated with high-amplitude voice signals. The output of detector circuit 330 is applied on a transmission line 332 as input signals to an attenuation hold register 334 and a matching delay circuit 336. The attenuation hold register 334 is responsive to the gain control signal GC previously described with respect to FIG. 1 and the output signal from detector circuit 330 on line 332 to apply an attenuation state signal on line 338 to attenuator circuit 304 only when the analog voice signal is below a predetermined magnitude.

The matching delay circuit 336 is clocked by clock signal CA and is utilized to apply a delay signal on transmission line 340 to the control circuit 320 so as to compensate for delay time associated with the various filtering and A/D converter circuitry previously described. The output signal of attenuation hold register circuit 334 applied to transmission line 338 is also utilized as an input signal to the output control circuit 320 so as to provide the previously described gain exponent signal GE on transmission line 130.

The "push-to-talk" signal applied from PTT switch 110 described with respect to FIG. 1 is transmitted on line 116 as separate signals PTTA and PTTB through a relay circuit 350 which provides a resultant activation signal on transmission line 352. This activation signal is applied to the control circuit 320 on transmission line 354 after being applied through a signal "debounce" circuit 356 so as to prohibit any transient signals from occurring due to bouncing of various mechanical relays and switches.

The A/D converter circuit 137 is also utilized to apply enable and disable signals on transmission line 360 to an enable/disable circuit 362. Circuit 362 is utilized to apply a reset signal RST to the output control circuit 320 through transmission line 362. Further, circuit 362 supplies a "completion" signal CPLT to the buffering control circuitry of recognition system 100 previously described with respect to FIG. 1. Control of the output signals from output control circuit 320 is also partially accomplished through a bus-control signal BC applied through inverter circuit 370 to the control circuit 320

As previously described with respect to FIG. 1, the utterance boundary detector circuitry 214 provides determinations of beginning and end frame signals corresponding to the statistical beginning and end of the operator's command utterance. One exemplary embodiment of a boundary detection procedure employs certain parameters of the speech signal samples to determine the boundary between frame signals comprising "noise" and those frame signals corresponding to an operator's actual command utterance. Because of the varying characteristics of noise within frames having an absence of a speech pattern, the detection procedure must determine in advance how the noise changes in order to enable more optimal detection. One approach is to therefore compute statistics of the noise frames utilizing the "silence" region existing before each spoken command utterance. However, undesirable features may still exist since noise statistics may not be substantially accurate because of only a limited silence region between command utterances, sudden modification in noise power, and variance of noise characteristics at different periods of time.

One procedure for detecting frame signals corresponding to the beginning and end of spoken command utterances substantially overcomes these difficulties. This procedure first assumes that a predetermined number of noise frames are available immediately prior to each spoken command utterance. A symbolic diagram depicting this assumption is illustrated in FIG. 3. Certain statistical parameter signals are then computed for various features of the frame signals corresponding to noise frames and the frame signals corresponding to the spoken command utterance. The following paragraphs describe in detail a particular procedure which can be utilized in accordance with the foregoing to detect beginning and end frame signals.

Assuming that a particular desired feature is represented by the symbol Y, the mean value of this feature is symbolically depicted $\overline{Y}^m$ as and the "mean absolute deviation" (MAD) is symbolically depicted as $\sigma_Y^m$. The superscript index defines the mean or the mean absolute deviation at the mth command word. Accordingly, the mean and mean absolute deviation of the first word are computed as follows with respect to the computation of noise statistics corresponding to the first word:

$$\overline{Y^1} = \frac{1}{F} \sum_{i=1}^{F} Y_i \qquad (4)$$

$$\sigma_Y{}^1 = \frac{1}{F} \sum_{i=1}^{F} |Y_i - \overline{Y^1}| \qquad (5)$$

where F corresponds to the number of frame signals assumed to be noise frames available prior to each spoken command word. For example, F may be equal to 8 and the following equations will be described accordingly.

The predetermined number of noise frame signals are accumulated for each succeeding word command. For the next three words, the mean and mean absolute deviation statistical characteristics of the noise frames are computed as follows:

$$\overline{Y^{l+1}} = \frac{8l\overline{Y^{l-1}} + \sum_{i=1}^{8} Y_{i+8l}}{8l+8} \qquad (6)$$

$$\sigma_Y{}^{l+1} = \frac{8l\sigma_Y{}^l + \sum_{i=1}^{8} |Y_{i+8l} - \overline{Y^{l+1}}|}{8l+8} \qquad (7)$$

where l=1, 2 and 3. To obtain a representation within the noise statistics reflecting possible modification in noise power, the noise statistics following the fourth word are computed differently. That is, they are computed as follows, $$\overline{Y^{l+k}} = \frac{16\overline{Y^l} + \sum_{i=1}^{8k} Y_{i+8l}}{16+8k} \qquad \begin{array}{l} k=1,2 \\ l=4,6,8,10 \end{array} \qquad (8)$$

$$\sigma_Y{}^{l+k} = \frac{16\sigma_Y{}^l + \sum_{k=1}^{2}\sum_{i=1}^{8} |Y_{i+8(l+k-1)} - \overline{Y^{l+k}}|}{16+8k} \qquad (9)$$

The feature signals of the speech sample signals which can be utilized for word boundary detection in accordance with the invention can comprise speech energy and other types of feature characteristics. Speech energy can be defined as the zeroth order auto-correlation signal for each frame signal. Correspondingly, a "noise LPC prediction error" signal can be computed in accordance with the following equation:

$$S_n = R_o E_d \qquad (10)$$

where $R_o$ is the zeroth order auto-correlation signal and $E_d$ the normalized LPC prediction error signal. The statistics of speech energy and LPC prediction error characteristic signals can be computed directly using the aforedescribed equations 4-9 with the substitution of the variable Y by the desired feature characteristic signal.

After completing computation of noise statistics for the current spoken command word, beginning frame signal detection can be initiated by computing the speech energy and other statistical paramater signals for successive frame signals and comparing these characteristics with average values of corresponding characteristics for the assumed noise frames. A set of "similarity" signals can then be derived in any desired manner to correlate the similarity between unknown frame signals and assumed noise frame signals. These similarity signals can then be compared with average values of the noise LPC prediction error signals computed in accordance with Equation 10. A detailed sequence diagram of the beginning frame detection operations is depicted in FIG. 4.

Figure 4:
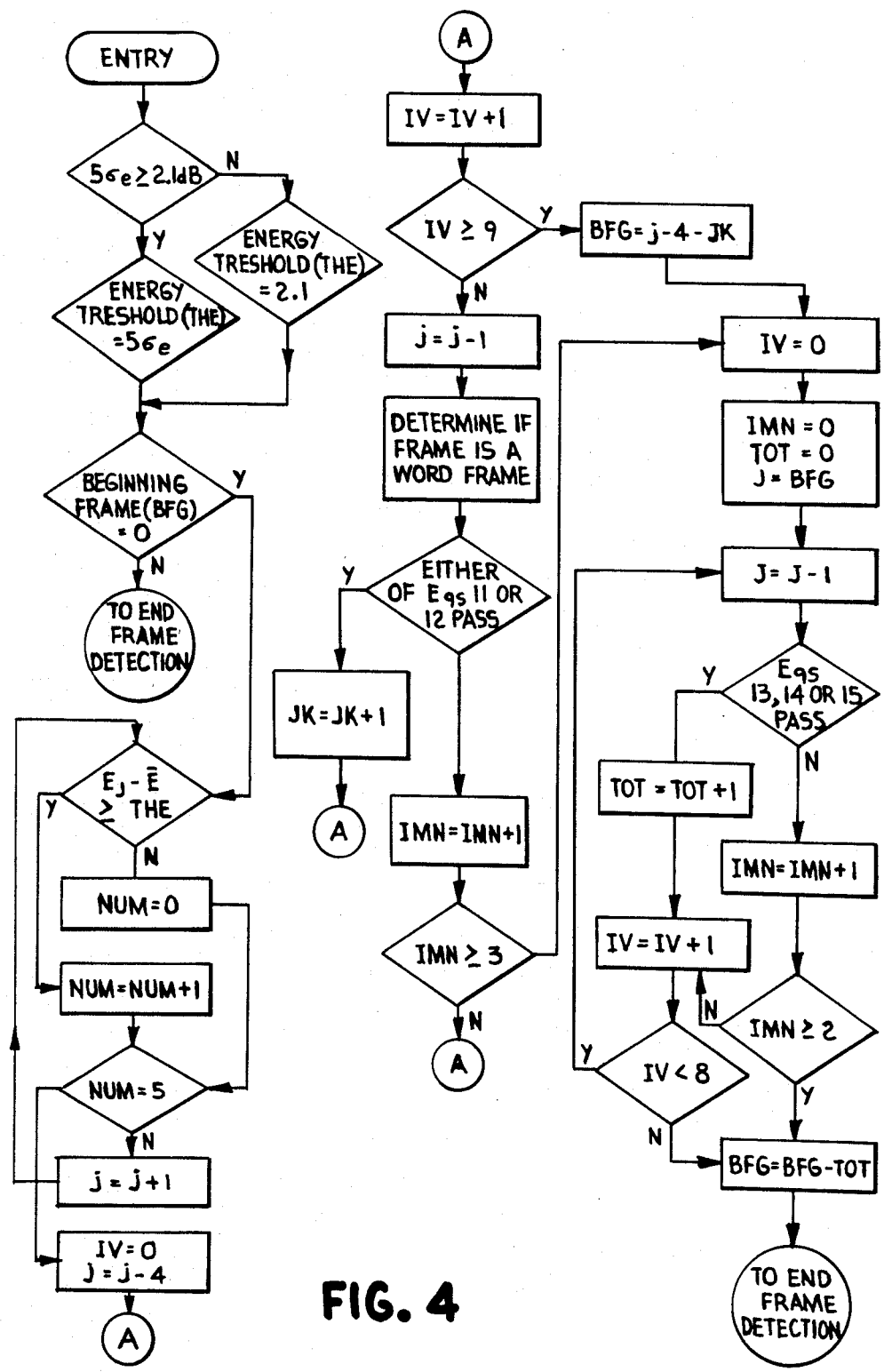
FIG. 4 is a sequence diagram illustrating an exemplary procedure for detecting the beginning of an unknown utterance.

As illustrated in FIG. 4, in order to prevent detection of a sudden "jump" of noise energy, a spoken command word can be characterized as being detected only after detection of five continuous frame signals having energy greater than that of the noise by the larger of predetermined statistical values. For example, the detection circuitry can be arranged so that five continuous frame signals with energy greater than that of noise frame signals by the larger of 5 $\sigma_e$ and 2.1 dB are required, where $\sigma_e$ is the mean absolute deviation of the frame signal energy.

When a beginning frame signal is "roughly" determined in accordance with the aforedescribed procedure, a more accurate beginning frame signal can be computed by examining frame signals in a reverse manner. During this procedure, each frame signal is checked to determine whether it is a possible word frame or a noise frame signal. This reverse examination procedure can include more "severe" comparison thresholds between statistical parameters of assumed noise and speech frames. For example, assume $E_j$, $\overline{E}$ and $\sigma_e$ represent jth frame average energy, average noise energy and noise energy mean absolute deviation. A frame signal j can then be characterized as a possible beginning word frame signal whenever either of the following computations is true:

$$E_j - \overline{E} \geq 2\sigma_e \text{ or} \qquad (11)$$

$$\frac{E_j - \overline{E}}{\sigma_e} \geq 5 \qquad (12)$$

If both of the above conditions fail, the frame j is characterized as a noise frame signal. A conventional counter storage location can be utilized to accumulate the number of possible word frame signals during the reverse examination process. In accordance with this procedure, if a predetermined maximum number of frames have been examined or a lesser predetermined maximum number of noise frame signals are detected, an initial beginning frame signal is computed as the current frame signal.

Figure 5:
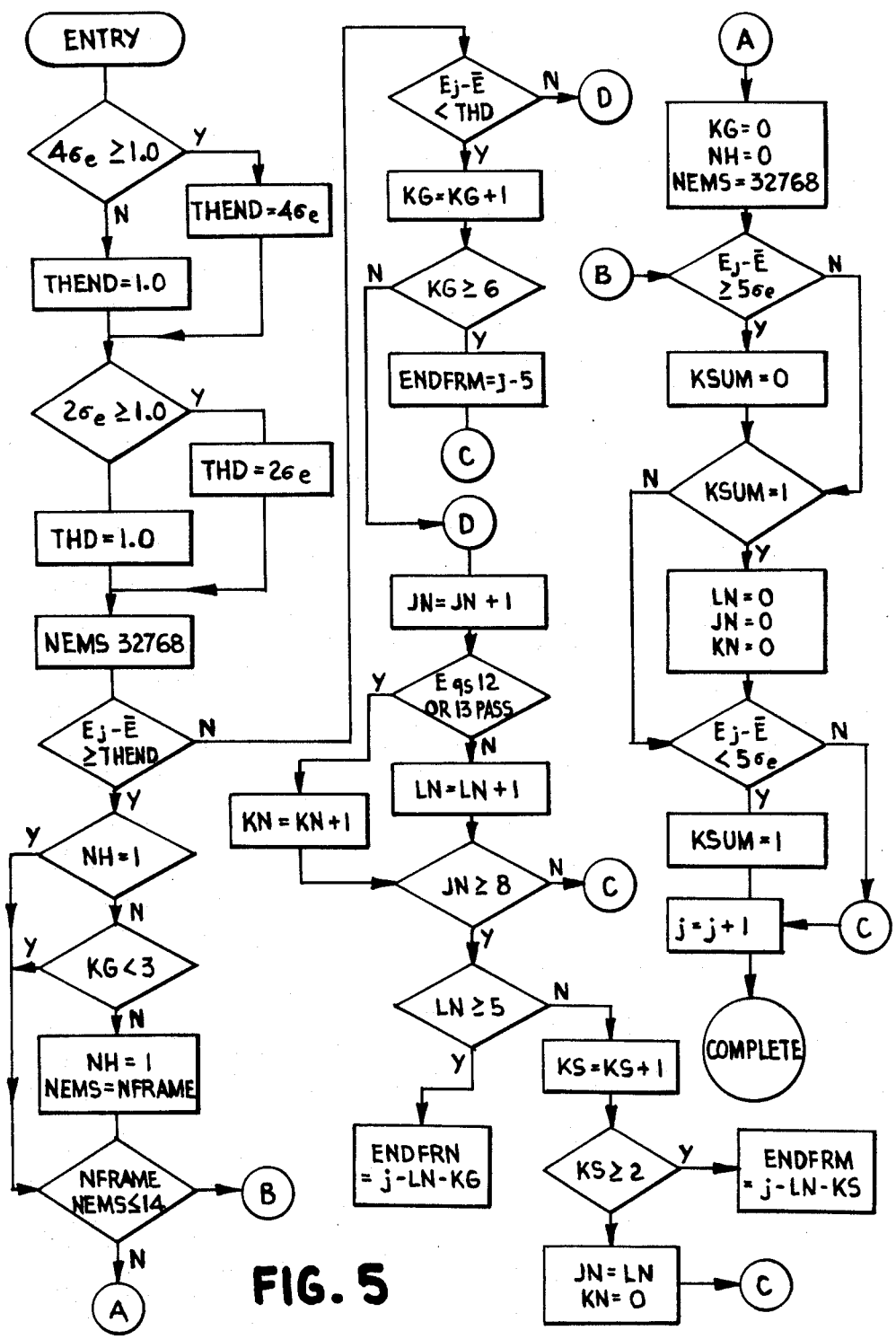
FIG. 5 is a sequence diagram illustrating an exemplary procedure for detecting the end of an unknown utterance.

Following determination of a beginning frame signal corresponding to the beginning of the spoken command utterance, the detection circuitry 214 can then be utilized to obtain an "end" frame signal for the command utterance. A sequence diagram illustrating in detail an exemplary procedure for detecting an end word frame signal in accordance with the invention is illustrated in FIG. 5. Upon initiation of the end frame signal detection procedure, two individual threshhold signals are determined. An upper threshhold signal, characterized as THEND, can be the larger of 4 $\sigma_e$ and 1.0 dB. The lower threshhold signal, defined as THD, can be the larger of 2 $\sigma_e$ and 1.0 dB. For purposes of characterizing the frame signals, a frame is defined as a "weak" utterance frame signal if $E_j$ minus $\overline{E}$ is smaller than THEND. Again, a counter memory location can be utilized to accumulate the number of weak frame signals such that $E_j$ minus $\overline{E}$ is less than or equal to THD. In accordance with an exemplary embodiment, if the counter value is greater than or equal to 6, the end of the vocal command utterance is characterized as having been detected. Accordingly, the end frame signal is detected regardless of the existence of a noise power "jump" or possible inaccurate noise statistical signals.

However, before the end of an utterance is characterized by a particular frame signal, each weak utterance frame signal is further checked to determined if it should be included as an utterance frame signal. One means of accomplishing this procedure is to include a weak utterance frame signal as part of the spoken command utterance if any of the following conditions is achieved:

$$E_j - \bar{E} \geq 2\sigma_e \text{ or} \quad (13)$$

$$\frac{E_j - \bar{E}}{\sigma_e} \geq 5 \quad (14)$$

As depicted in the illustrative sequence diagram of FIG. 5, three separate counter memory locations JN, LN and KN can be utilized for detecting the end frame signal. Whenever either one of the conditions set forth in Equations 13 or 14 is satisfied, KN can be incremented by one, otherwise LN is incremented by one. The counter JN is characterized as the number of weak frame signals checked and is the sum of the counters LN and KN. If at any point, five out of eight continuous weak frame signals are determined to be noise frames, the frame signal corresponding to the end of the spoken command utterance is characterized as being detected. Otherwise the procedure is continued. However, the procedure is repeated only two times in order to minimize any effect of nonstationary noise power or inaccurate noise statistics.

If the computation of $E_j$ minus $\bar{E}$ is greater than THEND, the utterance frame is characterized as a "strong" utterance frame. If the counter value used to accumulate the number of weak utterance frames is greater than or equal to three, the frame number corresponding to the strong utterance frame signal is saved in a separate buffer. If no end utterance frame signal is detected, for example, 15 frame signals after the stored frame signal, then the counter used to accumulate the number of frame signals is reset to zero. In such a case, these frame signals are characterized as merely "stops" within the speech pattern. Additionally, if it is detected that $E_j$ minus $\bar{E}$ is greater than or equal to 5 $\sigma_e$, then all of counters LN, JN and KN are also set to zero. Correspondingly, if 4 $\sigma_e$ is less than or equal to $E_j$ minus $\bar{E}$ less than or equal to 5 $\sigma_e$, then the counters LN, JN and KN are reset only once. This particular resetting procedure is utilized to prevent the inclusion of additional noise frame signals merely due to nonstationary noise.

It should be emphasized that other types of utterance boundary detection sequences can be utilized in accordance with the basic features of the invention. For example, one type of detection procedure which may be advantageous in high noise environments and/or with a pilot's use of oxygen mask equipment involves the detection of speech by characterization of frame signals as corresponding to noise, voiced or unvoiced regions of the voice command. As well known to those skilled in the art of speech recognition systems, voiced speech corresponds to utterances produced by vocal chord vibrations.

A detection procedure in accordance with the foregoing can include filtering and more rapid sampling of the speech frame signals, in combination with computation of autocorrelation signals of the sampled signals. The autocorrelation signals and statistical parameter signals of the sampled signals can be utilized to characterize the frame signals as noise, voiced or unvoiced speech regions. Subsequent to characterization of the frame signals, a predetermined process for detecting beginning and end frame signals based on the speech region characterizations can be utilized.

In accordance with the foregoing descriptions, signals BF and EF on transmission lines 216 and 218 as illustrated in FIG. 1 correspond to identification numbers of the frame signals characterized as the beginning and end, respectively, of the spoken command word. However, still other detection procedures can also be utilized in accordance with the invention. For example, it may be advantageous to include within the detection procedure a characterization of a "minimum" or a "maximum" constraint on the number of frame signals possible within any particular command utterance. That is, any detected command utterance having a frame signal length outside of the bounds of such limits is rejected by the recognition system 100. It should also be noted that the actual number of noise frames which will exist between any particular command utterances will in part be determined by the operator's tendency to activate the PTT switch 110 described with respect to FIG. 1 either immediately upon the speaking of command utterances into the microphone circuit 102, or the tendency for the operator to activate the PTT switch 110 at a time substantially prior to the speaking of command utterances.

As also described with respect to FIG. 1, the pattern recognition detector circuitry 230 operates to compare the spoken command utterance with each of the limited vocabulary of reference utterances stored in reference store 104. Various types of comparison procedures and acceptance/rejection threshhold determinations have been set forth in prior art recognition systems. For purposes of complete understanding of the invention, one type of comparison procedure which does not utilize the noise compensation arrangement in accordance with the invention will now be described. This particular comparison procedure is set forth in the previously cited and commonly assigned Eckley patent application.

The pattern recognition detector circuitry 230 can utilize a procedure whereby a measure of "similarity" is determined between the parameter signals corresponding to the vocal command word and the parameter signals of the reference words as stored in reference word store 104. Specifically, the detector circuitry 230 would utilize the arrays of the linear predictive parameter signals for the frame signals corresponding to the spoken command utterance as determined by the beginning and end frame signals of the utterance represented by signals BF and EF described with respect to FIG. 1. These linear predictive parameter signals include PARCOR coefficient signals.

Figure 6:
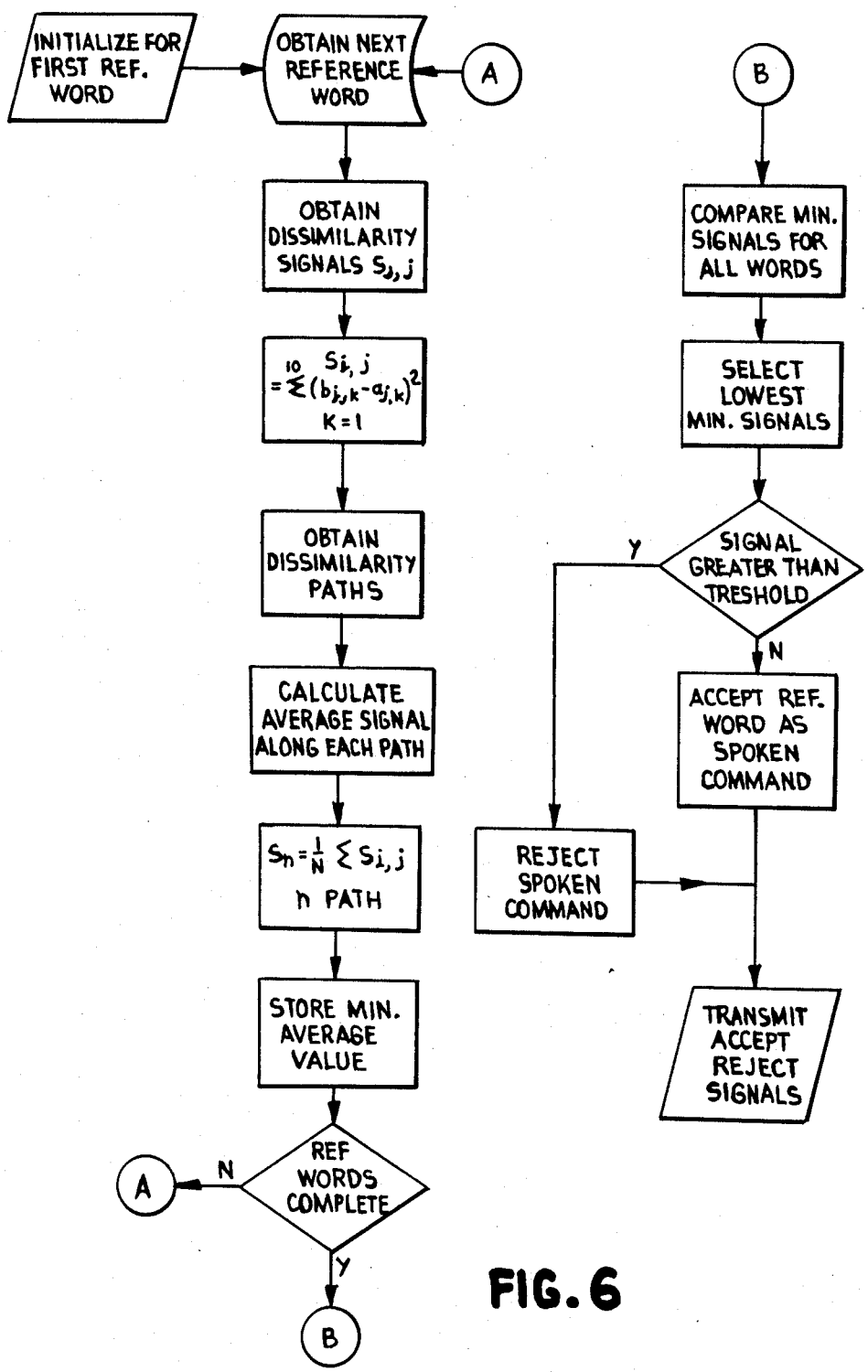
FIG. 6 is a sequence diagram illustrating an exemplary procedure to compare linear prediction parameter signals representative of an unknown utterance spoken by an operator and a limited vocabulary of reference words.

The basis for making the comparison in the pattern recognition detector circuitry 230 would be to compare the similarity between speech signals in each ith frame signal of the spoken command utterance with the speech signals in the jth frame of each of the reference utterances stored in the reference word store 104. A sequence diagram illustrating an exemplary procedure is depicted in FIG. 6. Such a measure of "dissimilarity" can be defined in accordance with the following equation utilizing an exemplary order of 10 for the partial correlation coefficient signals:

$$S_{i,j} = \sum_{k=1}^{10} (b_{i,k} - a_{j,k})^2 \quad (15)$$

where $b_{i,k}$ is a kth partial correlation coefficient signal associated with the ith frame of the vocal command utterance and $a_{j,k}$ is a kth partial correlation coefficient associated with the jth frame of the particular reference utterance being compared. The distance signals $S_{i,j}$ would be characterized as a matrix set of dissimilarity comparisons between the frame signals.

The vocal command utterance could be compared to the reference utterances by determining a minimum dissimilarity "path" through the matrix of the distance signals $S_{i,j}$. An overall measure of dissimilarity $S_n$ along the nth path would be defined as the average of all distance signals encountered along the path in accordance with the following equation:

$$S_n = \frac{1}{N} \sum_{n^{th}\text{path}} S_{i,j} \quad (16)$$

The allowable range of utterance boundary errors as well as reasonable maximum and minimum values for instantaneous time scaling differences between the compared command words would limit the actual allowable paths to be measured.

The overall measure of dissimilarity $S_n$ (i.e., an average distance signal) along each of the n paths would then be compared with the average distance signals of other paths to determine the overall dissimilarity between the compared words. It should be emphasized that the compared utterances need not have equivalent numbers of frame signals.

Following a determination of the overall dissimilarity between the spoken command utterance and the reference utterances within memory store 104, the average distance signal having the minimum value among all signals would be characterized as corresponding to the "most possible" reference utterance to which the unknown vocal utterance corresponds. Following this comparison procedure, the minimum overall dissimilarity signal would be compared to a predetermined rejection/acceptance threshold signal defining the value of the dissimilarity signal whereby if the dissimilarity signal had a value greater than the threshold signal, the vocal command utterance would be rejected. Correspondingly, if the minimum dissimilarity signal was less than the threshold signal value, the vocal command utterance would be accepted as a particular reference word.

As previously described with respect to FIG. 1, signals defining acceptance or rejection of the vocal command utterance as corresponding to a particular reference utterance can be applied to transmission line 232 as illustrated in FIG. 1. Additional signals can also be transmitted on transmission line 232 to processor circuit 236 defining the particular reference utterance to which the vocal command utterance has been identified as corresponding thereto. Various types of comparison threshold signals can be utilized. For example, the particular threshold signal may be computed on the basis of statistics of incoming speech signals or it may be a constant signal determined prior to operation of the recognition system 100.

The foregoing description of a pattern recognition process to compare the reference signals representative of a library of known utterances with the signals representative of the unknown utterance does not account for the differences between acoustical background noise occurring during the speaking of the unknown utterance and the acoustical background noise which had previously occurred during training of the system to obtain the reference signals representative of the vocabulary of known utterances. That is, the foregoing pattern recognition procedure basically assumes generation of the unknown utterance and the signals representative of the reference utterances as occurring in an essentially noise free environment. Accordingly, when noise is present in a system, degradation in the pattern recognition process accuracy will occur.

In accordance with the invention, the recognition system 100 includes means for functionally synthesizing a theoretically optimum word classifier arrangement when the spoken unknown utterances are contaminated by acoustical background noise. That is, the system utilizes the knowledge of the acoustical background noise to classify the unknown utterance and the reference signals representative of the library of known utterances in an optimum fashion to maximize pattern recognition accuracy.

For purposes of general understanding of the recognition system 100 in accordance with the invention, the following description will refer to utilization of a voice feature signal commonly designated as predictor signal a, derived as R/T as previously described herein, where R represents the signal auto-correlations and T is the Töeplitz matrix. However, it should be emphasized that the following procedures of a pattern classification arrangement in accordance with the invention can be applied to linear predictive parameter signals other than the predictor signal a, and can further be applied to other signals representative of voice features in a recognition system utilizing frequency domain analysis.

Referring again to FIG. 1, the recognition system in accordance with the invention includes a noise estimator circuit 191 as previously described herein. The estimator circuit 191 is responsive to the frame signals $X_i$ representative of noise frames to generate the cumulative average $\overline{R}_n$ of the signal auto-correlations $R_n$ corresponding to frames representative of acoustical background noise. By continuously monitoring the acoustical background noise and thereby utilizing cumulative values of signal autocorrelations to obtain average autocorrelation values, the noise compensation arrangement in accordance with the invention is self-adaptive to the background noise.

The noise estimation signal $\overline{R}_n$ and corresponding average valued Töeplitz matrix $\overline{T}_n$ are applied as input signals to the noise compensator circuit 231 as depicted in FIG. 1. In addition, the parameter signals of the reference words stored in reference word store 104 can also be applied to the noise compensator circuit 231 as input signals thereto by means of transmission line 233.

The noise compensator circuit 231 is adapted to utilize the noise estimation signals applied on transmission line 193 to alter the parameter signals representative of the library of reference utterances so as to compensate for the effect of acoustical background noise occurring during the speaking of the unknown utterance. Various types of arithmetic procedures could be utilized for modifying the reference parameter signals in accordance with the noise estimation signals representative of acoustical background noise. One procedure for performing this modification in accordance with the invention is to derive the statistics of the parameter signals as a function of the acoustical background noise. Assuming that the reference parameter signals representative of the reference utterances are LPC predictor signals a, the mean $a_m$ and covariance P (for each frame) can be determined as a function of the acoustical background noise in accordance with the following equations:

$$A_m = (T_t + \overline{T}_n)^{-1}(R_t + \overline{R}_n); P = E_{t+n}(T + \overline{T}_n)^{-1} \qquad (17)$$

where the values $T_t$ and $R_t$ refer to the Töeplitz matrix and auto-correlation coefficient signals, respectively, representative of the originally stored known reference utterances, and the value $E_{t+n}$ is the linear coefficient analysis residual energy of the forward error filter predictor based on reference signal and noise information.

As previously described, the values $\overline{T}_n$ and $\overline{R}_n$ are obtained based on an analysis of the acoustical background noise during system operation. In accordance with equations 17, the reference signals representative of the known utterances are altered in accordance with the knowledge of acoustical background noise.

In accordance with one aspect of the invention, the statistical parameter signals representative of the reference utterances but altered in accordance with the acoustical background noise can be utilized to derive probability density functions relating the altered parameter signals of each of the reference utterances to the parameter signals of the unknown utterance. Specifically, the altered parameter signals previously described can be applied on transmission line 235 as input signals to the compensated word store 237. As required, and under operation of the I/O processor 236, the altered reference signals are further applied as input signals to the recognition detector 230 by means of the transmission line 239. As apparent, it is also assumed that the parameter signals representative of the unknown utterance which are applied to recognition detector 230 by means of transmission line 222 include LPC predictor signals a.

Because of the Gaussian characteristics of the predictor signals a, the probability density function relating the parameter signals of the unknown utterance to the altered parameter signals $a_m$ representative of the reference utterances and the acoustical background noise is represented by the following equation:

$$P(a) = \frac{1}{|P|^{\frac{1}{2}}} e^{-\frac{1}{2}(a-a_m)^t P^{-1}(a-a_m)} \qquad (18)$$

where the superscript t is a matrix notation representing computation of the density function over the corresponding matrix. By computing the maximum of the probability density functions for each of the words of the stored vocabulary, an optimum classification scheme can be obtained. That is, the probability density functions are maximized over all of the stored parameter signals representative of the reference utterances (but altered in accordance with the acoustical background noise) and then utilized as the classification criteria. It is apparent that various types of threshold recognition criteria can also be utilized with the classification criteria based on the probability density functions.

Figure 7:
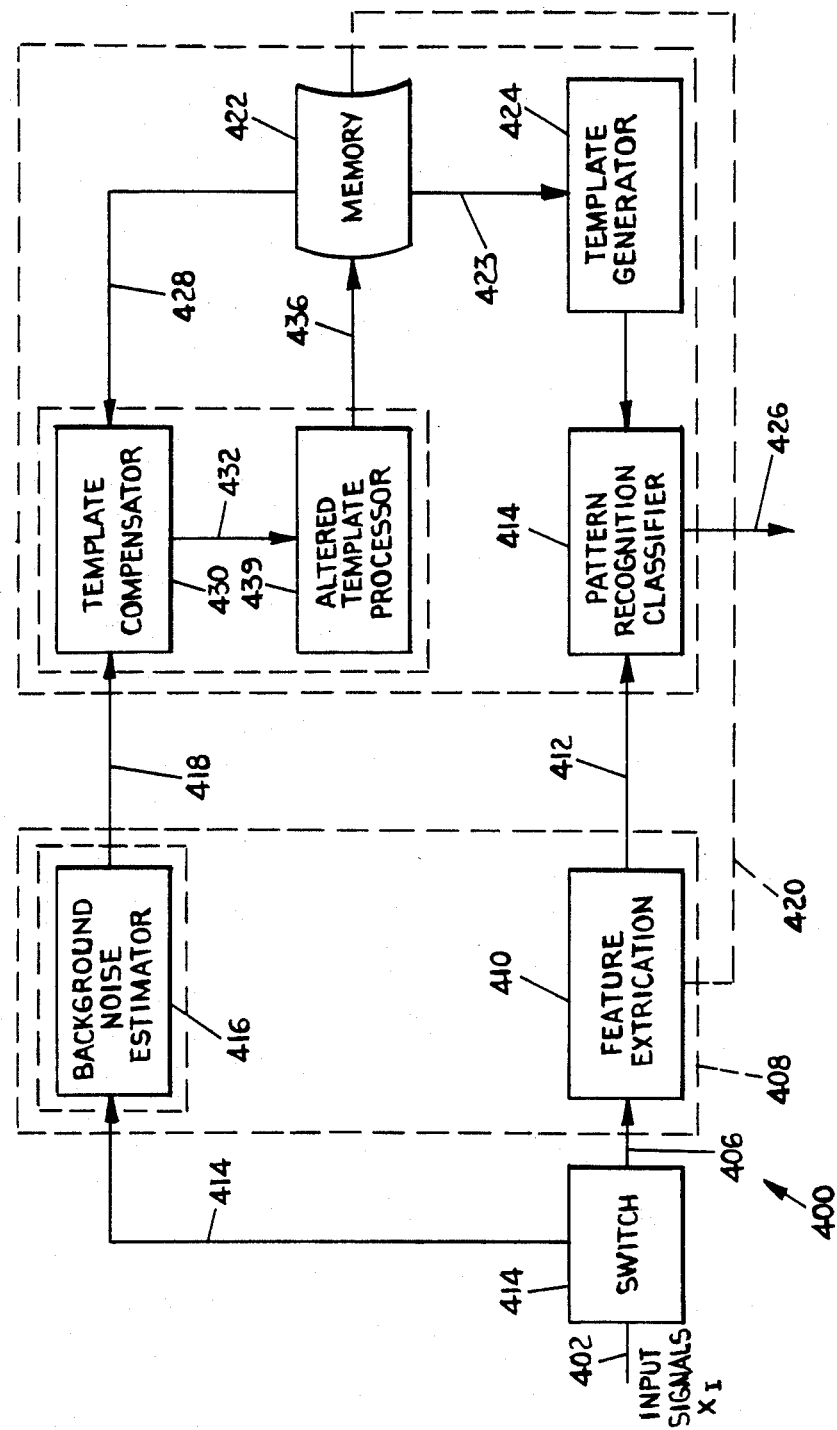
FIG. 7 is a functional block diagram of a generalized noise compensation arrangement in accordance with the invention and adapted for use with a recognition system wherein feature signals representative of an unknown utterance spoken by an operator are compared with comparable signals representative of a limited vocabulary of reference words.

As previously described, the concepts of a noise compensation arrangement in accordance with the invention are not limited to the particular recognition system 100 described herein. For purposes of understanding, a functional diagram of a noise compensation arrangement in accordance with the invention and applicable to various types of recognition systems is depicted in FIG. 7. Specifically, the noise compensation arrangement 400 depicted in FIG. 7 utilizes input signals $X_i$ which can comprise any of numerous types of electrical signals representative of spoken utterances and acoustical background noise. The input signals $X_i$ are applied on a line 402 to a functional switch 404 which comprises a means for differentiating those input signals representative of the spoken utterance from input signals representative of acoustical background noise. In the previously described recognition system 100, the functional switch 404 was provided by means of the boundary detection signals which provided differentiation of those frame signals representative of the spoken utterance and from the frame signals representative of acoustical background noise.

The signals representative of both the spoken utterance and the acoustical background noise are applied to a parameter generation circuit 408 which provides a means for generating parameter signals by means of either a time domain or frequency domain analysis of the frame signals. Specifically, the input signals representative of the spoken utterance are applied on line 406 to a feature signal extraction circuit 410 which generates output feature signals on line 412 representative of the spoken unknown utterance. In a time domain analysis system, the signals on line 412 can be linear prediction parameter signals. Likewise, in a frequency domain analysis system, these signals may represent characteristics such as energy content, signal slope and the like.

The input signals representative of acoustical background noise are applied on line 414 to a background noise estimator circuit 416. In the recognition system 100 previously described herein, the noise estimator circuit 191 corresponds to the background noise estimator circuit 416 depicted in FIG. 7. The output signals of the estimator circuit 416 are applied on transmission line 418 and comprise noise estimation signals representative of the acoustical background noise and are in the same dimensions, i.e. equivalent parameter characteristics, as the feature signals on line 412 representative of the spoken utterance.

During the training mode of a recognition system having a noise compensation arrangement 400 in accordance with the invention, the feature signals generated by the feature signal extraction circuit 410 are applied on a transmission line 420 directly to a reference memory 422. During the recognition phase operation of a typical time domain or frequency domain recognition system, the feature signals previously stored in memory 422 are applied as input signals to a template generator 424 which generates a "template" for each of the reference utterances. These templates typically comprise the feature signals obtained from the feature signal extraction circuit 410 for signals derived therefrom and are applied as input signals to the classifier circuit 414. Also during the recognition phase of the system operation, the feature signals representative of the unknown utterance are applied on line 412 to the pattern recognition classifier system 414. The recognition classifier circuit 414 applies an output signal on line 426 representative of the recognition (or absence of recognition) of the feature signals representative of the unknown utterance as corresponding to signals of the templates representative of a particular one of the reference utterances.

In accordance with the invention, during the recognition phase of system operation, the signals stored in memory 422 are applied as input signals on line 428 to a template compensator circuit 430. Also applied as input signals to the compensator circuit 430 are the noise estimation signals from circuit 416 by means of line 418. The template compensator circuit 430 is adapted to derive statistical signals which are a function of the previously stored reference signals representative of the known utterances and the noise estimation signals representative of the acoustical background noise occurring during the speaking of the unknown utterance. These derived signals are applied on line 432 to an altered template processor circuit 434 which is adapted to generate corresponding altered template parameter signals and store these signals in the memory 422. The altered template parameter signals can be characterized as the parameter signals of the reference utterances which would have been originally generated had the reference utterances been spoken during the training mode in an environment having acoustical background noise equivalent to that noise occurring during the speaking of the unknown utterance.

As previously described, the noise compensation arrangement 400 can be applied to various types of recognition systems, including those systems which attempt to recognize an unknown utterance as one of a vocabulary of reference utterances by utilizing feature signals comprising characteristics derived by either a time domain or frequency domain analysis. In addition, the concepts of a noise compensation arrangement in accordance with the invention can be applied to either a speaker "dependent" system or a speaker "independent" system. Furthermore, these concepts can be applied to recognition systems whereby the purpose of the system is to recognize the "speaker" as one of a plurality of speakers, instead of the general purpose of recognizing the spoken utterance as a particular word or sequence of words.

In partial summary of a noise compensation arrangement in accordance with the invention, the parameters to be utilized in a recognition system in which the compensation arrangement is applied are first selected. Such parameter signals are generated from known spoken words and stored in a system memory (the storage partitioning commonly referred to as "templates") during the training mode for subsequent use during the recognition phase of system operation. During the recognition phase, the recognition system monitors the background noise on a continuous basis, thereby obtaining statistics of the acoustical background noise in terms of cumulative values obtained in terms of linear predictive parameter signals or frequency domain analysis signals. During the monitoring of the acoustical background noise, the recognition system generates classification parameters for the unknown utterances which are equivalent in dimension to the classification parameters utilized for the reference word templates. Both the statistical signals representing the acoustical background noise and the parameter signals representative of the unknown utterance are transmitted to recognition processing circuitry which is adapted to receive the signals of the stored templates. As in prior art systems, the classification process takes place between parameters of the spoken utterance and equivalent parameters obtained from the stored templates. However, in accordance with the invention, the parameters of the stored templates are altered in accordance with the statistical noise signals.

The noise compensation arrangement in accordance with the invention is self-adaptive since the acoustical background noise is continuously monitored. Again, it should be noted that various types of pattern classification criteria can be utilized in accordance with the invention. That is, various arithmetic matching procedures may be utilized between the parameter signals of the spoken utterance and the templates altered in accordance with the acoustical background noise.

The alteration of stored template signals essentially corresponds to obtaining a set of equivalent and analytically predicted signals that would represent the stored templates if such templates had been generated in the same acoustical environment as exists during the speaking of the unknown utterance. As described with respect to the exemplary recognition system 100 herein, coefficients of linear predictive signals can be modified in accordance with the acoustical background noise. In a similar manner in a recognition system utilizing a frequency domain analysis, the energy of filter banks could be modified by compensating for the energy that would have occurred if the stored templates had been created in the same environment in which the recognition system was operating during the speaking of the unknown utterance.

It should be noted that the various details of the system 100 described herein as an exemplary embodiment of a speech recognition system in accordance with the invention are not meant to be exhaustive. It will be apparent to those skilled in the art of speech recognition system design that other modifications and variations of the above-described illustrative embodiments of the invention can be effected without departing from the spirit and scope of the novel concepts of the invention.

APPENDIX A
GENERATE PREDICTOR ERROR SIGNALS,
PREDICTOR AND PARCOR COEFFICIENT SIGNALS

```
B(1) = R(1)/R(0),
A(1) = B(1)
E = R(0) − R(1) * B(1)
DO 30 K=2,M
    SUM = 0
    DO 10 L=1,K−1
        C(L) = A(L)
        SUM = SUM + A(L) * R(K−L)
    CONTINUE
    TEMP = R(K) − SUM
    B(K) = TEMP/E
    E = E − B(K) * TEMP
    A(K) = B(K)
    DO 20 L=1, K−1
        A(L) = C(L) − B(K) * C(K−L)
20  CONTINUE
30 CONTINUE
```

APPENDIX B
GENERATE AUTOCORRELATION SIGNALS

```
RO =0
DO = 10 K=1,N
    RO = X(K) * X(K) + RO
10 CONTINUE
    DO 30 K=1,M
        R(K) = 0
```

APPENDIX B
GENERATE AUTOCORRELATION SIGNALS

```
        DO 20 L=1, N−K
            R(K) = X(L) * X(K+L) + R(K)
        20 CONTINUE
    30 CONTINUE
```

The embodiments of the invention in which an exclusive property or privilege is claimed are defined as follows:

1. In a recognition system having input means for receiving unknown utterances spoken by an operator and generating feature signals representative thereof, storage means for storing sets of reference signals representative of a vocabulary of reference utterances, and comparator means for comparing the feature signals with the sets of reference signals, the improvement which comprises a noise compensation arrangement, the arrangement comprising:
   noise estimator means connected to the input means for generating noise estimation signals representative of acoustical background noise occurring during the speaking of the unknown utterances; and
   compensation means jointly responsive to the noise estimation signals and the sets of reference signals for altering the sets of reference signals in accordance with the acoustical background noise prior in time to comparison of the reference signals with the feature signals.

2. A recognition system in accordance with claim 1 characterized in that the input means comprises:
   converting means for converting the unknown utterances and acoustical background noise into sequential analog signals;
   signal conditioning means responsive to the analog signals for sampling the analog signals at a predetermined sample rate and generating sets of sample signals corresponding to the unknown utterances and the acoustical background noise;
   feature extraction means responsive to the sample signals representative of the unknown utterances for generating the feature signals; and
   the noise estimator means is responsive to the sample signals representative of the acoustical background noise for generating the noise estimation signals.

3. A recognition system in accordance with claim 2 characterized in that the noise estimation means comprises noise averaging means responsive to the sample signals representative of the acoustical background noise for generating statistical noise signals representative of cumulative averages of the acoustical background noise occurring prior in time, wherein the noise estimation signals comprise the statistical noise signals.

4. A recognition system in accordance with claim 2 characterized in that the feature extraction means comprises means responsive to the sample signals representative of the unknown utterances for generating sets of linear prediction parameter signals, wherein the feature signals comprise the sets of linear prediction parameter signals; and
   the noise estimator means comprises means for generating statistical noise signals corresponding to a time domain analysis of the sample signals representative of the acoustical background noise, wherein the noise estimation signals comprise the statistical noise signals.

5. A recognition system in accordance with claim 4 characterized in that the statistical noise signals comprise auto-correlation coefficient signals corresponding to auto-correlations of the sample signals representative of the acoustical background noise.

6. A recognition system in accordance with claim 4 characterized in that the statistical noise signals comprise a set of average signals representative of the cumulative average of auto-correlation coefficient signals for each set of sample signals representative of acoustical background noise.

7. A recognition system in accordance with claim 2 characterized in that the feature extraction means is responsive to the sets of sample signals representative of acoustical background noise for generating additional feature signals representative thereof, and the recognition system further comprises:
   boundary detection means responsive to the feature signals and the additional feature signals for detecting the beginning and end of the unknown utterances and for generating utterance boundary signals corresponding thereto; and
   the noise estimator means comprises means responsive to the utterance boundary signals for selecting from the sets of sample signals representative of acoustical background noise and unknown utterances only those sample signals representative of the acoustical background noise and generating the noise estimation signals in accordance therewith.

8. A recognition system in accordance with claim 1 characterized in that the input means comprises:
   converting means for converting the unknown utterances and acoustical background noise into sequential analog signals;
   feature extraction means for generating spectral signals corresponding to a frequency domain analysis of the analog signals, wherein the feature signals comprise the spectral signals; and
   the noise estimation means comprises means for generating statistical noise signals corresponding to a frequency domain analysis of the analog signals representative of acoustical background noise, wherein the noise estimation signals comprise the statistical noise signals.

9. A recognition system in accordance with claim 1 characterized in that the comparator means comprises:
   means jointly responsive to the feature signals and the altered sets of reference signals for generating sets of probability density signals, wherein each set of probability density signals is a function of the feature signals and one of the sets of altered reference signals representative of one of the reference utterances; and
   means for selecting one of the reference utterances of the vocabulary of reference utterances as corresponding to the unknown utterances on the basis of the relative values of each of the sets of probability density signals.

10. A recognition system in accordance with claim 9 characterized in that the compensation means comprises:
   means responsive to the noise estimation signals and the sets of reference signals for generating reference mean and reference variance signals for each of the reference utterances of the library of reference utterances; and
   the means jointly responsive to the feature signals and the altered sets of reference signals is responsive to the reference mean and reference variance signals for generating the sets of probability density signals.

11. A recognition system in accordance with claim 9 characterized in that the means for selecting one of the reference utterances comprises:
   means for selecting from the sets of probability density signals the set of probability density signals having the maximum relative value; and
   means for selecting the reference utterance corresponding to the unknown utterances on the basis of the maximum valued set of probability density signals.

12. A recognition system in accordance with claim 1 characterized in that the parameter dimensions of the reference signals are equivalent to the parameter dimensions of the noise estimation signals.

13. A recognition system in accordance with claim 12 characterized in that the compensation means comprises:
   means for selectively retrieving each of the sets of reference signals from the storage means;
   means responsive to the retrieved reference signals for generating the altered sets of reference signals in accordance with the noise estimation signals; and
   the comparator means comprises means for sequentially comparing the feature signals with each of the sets of altered reference signals.

14. A recognition system in accordance with claim 13 characterized in that the compensation means further comprises means for storing the altered reference signals, wherein the altered reference signals are representative of each of the reference utterances of the vocabulary of reference utterances spoken simultaneously with the speaking of the unknown utterance.

15. A recognition system in accordance with claim 12 characterized in that the input means comprises:
   converter means for converting the unknown utterances and acoustical background noise into sequential analog signals;
   signal conditioning means responsive to the analog signals for sampling the analog signals at a predetermined sample rate and generating sample signals corresponding to the unknown utterances and the acoustical background noise; and
   feature extraction means responsive to the sample signals representative of the unknown utterances for generating the feature signals; and
   the feature extraction means comprises partitioning means for partitioning the sample signals into sequential frame signals, wherein each of the frame signals is representative of either the unknown utterances or acoustical background noise.

16. A recognition system in accordance with claim 15 characterized in that the noise estimation means comprises means for generating sets of the noise estimation signals, wherein each of the sets of noise estimation signals is representative of a different one of the frame signals representative of acoustical background noise.

17. A recognition system in accordance with claim 16 characterized in that the sets of reference signals includes subsets of reference signals, wherein each of the subsets is representative of a different frame of the reference utterances; and
   the compensation means comprises means for altering each of the subsets of reference signals in accordance with the sets of noise estimation signals.

18. A recognition system in accordance with claim 17 characterized in that the noise estimation means further comprises means for generating a set of statistical noise signals representative of a cumulative average of the acoustical background noise occurring prior in time, wherein the noise estimation signals comprise the statistical noise signals.

19. A recognition system in accordance with claim 18 characterized in that the reference signals comprise frame parameter signals for each frame of the library of reference utterances, and the compensation means comprises:
   means responsive to the statistical noise signals and the frame parameter signals for generating reference mean and reference variance signals for each frame of the library of reference utterances; and
   the comparator means comprises means jointly responsive to the reference mean signals, reference variance signals and the feature signals for generating sets of probability density signals representative of the probability density functions of the feature signals and reference signals.

20. A recognition system in accordance with claim 19 characterized in that the comparator means further comprises:
   means for selecting from the sets of probability density signals the set of probability density signals having the maximum relative value; and
   means for selecting the reference utterance corresponding to the maximum valued set of probability density signals as reference utterance corresponding to the unknown utterances.

21. A method for identifying unknown utterances spoken by an operator as corresponding to one of a vocabulary of predetermined reference utterances, the method comprising the steps of:
   storing sets of reference signals representative of differing utterances of the vocabulary of reference utterances;
   generating feature signals representative of the unknown utterances;
   generating noise estimation signals representative of acoustical background noise occurring during the speaking of the unknown utterances;
   altering the reference signals in accordance with the noise estimation signals;
   comparing the altered reference signals with the feature signals and generating comparison signals representative of the comparison; and
   selecting an utterance of the vocabulary of reference utterances as corresponding to the unknown utterances on the basis of the comparison signals.

22. The method in accordance with claim 21 characterized in that the method further comprises the steps of:
   generating sets of probability density signals, wherein each set of probability density signals is a function of the feature signals and the altered reference signals representative of one of the reference utterances;
   generating a comparison signal representative to the maximum valued set of probability density signals; and
   selecting as the reference utterance corresponding to the unknown utterances the reference utterance corresponding to the maximum valued comparison signal.

23. The method in accordance with claim 22 characterized in that the method further comprises the steps of:
    generating reference mean and reference variance signals as a function of the noise estimation signals and the reference signals for each reference utterance of the library of reference utterances; and
    generating the probability density signals as a function of the feature signals and the reference mean and reference variance signals.

24. The method in accordance with claim 23 characterized in that the method further comprises the steps of cumulatively averaging the acoustical background noise occurring prior in time to comparing the altered reference signals and the feature signals, and generating the noise estimation signals in accordance therewith.

25. A method for identifying unknown utterances spoken by an operator as corresponding to one of a vocabulary of predetermined reference utterances, the method comprising the steps of:
    storing sets of reference signals representative of differing utterances of the vocabulary of reference utterances;
    converting the unknown utterances and acoustical background noise into sequential analog signals;
    sampling the analog signals at a predetermined sample rate and generating sample signals corresponding to the unknown utterances and the acoustical background noise;
    generating feature signals corresponding to statistical characteristics of the sample signals representative of the unknown utterances;
    detecting the beginning and end of the unknown utterances, and generating utterance boundary signals representative thereof;
    selecting from the sets of sample signals representative of acoustical background noise and the unknown utterances only those sample signals representative of the acoustical background noise on the basis of the utterance boundary signals;
    generating noise estimation signals corresponding to the sample signals representative of acoustical background noise;
    altering the sets of reference signals in accordance with the noise estimation signals;
    generating sets of probability density signals, wherein each set of probability density signals is a function of the feature signals and the altered reference signals representative of one of the reference utterances; and
    selecting one of the reference utterances as corresponding to the unknown utterance on the basis of the relative values of the probability density signals.

26. The method in accordance with claim 25 characterized in that the method further comprises the steps of:
    partitioning the sample signals and the reference signals into sequential frame signals;
    generating reference mean and reference variance signals as a function of the noise estimation signals and the reference signals for each frame of the reference signals; and
    generating the sets of probability density signals as a function of the feature signals and the reference mean and reference variance signals for each frame of the reference signals.

27. The method in accordance with claim 26 characterized in that the method further comprises the steps of:
    generating sets of linear prediction parameter signals, wherein the feature signals and the reference signals comprise the sets of linear prediction parameter signals; and
    generating statistical noise signals representative of a time domain analysis of the sample signals representative of the acoustical background noise, wherein the noise estimation signals comprise the statistical noise signals.

* * * * *